United States Patent [19]

Kukol

[11] Patent Number: 5,481,708
[45] Date of Patent: Jan. 2, 1996

[54] SYSTEM AND METHODS FOR OPTIMIZING OBJECT-ORIENTED COMPILATIONS

[75] Inventor: Peter Kukol, Aptos, Calif.

[73] Assignee: Borland International, Inc., Scotts Valley, Calif.

[21] Appl. No.: 894,706

[22] Filed: Jun. 5, 1992

[51] Int. Cl.⁶ .............................. G06F 11/00; G06F 13/00
[52] U.S. Cl. .................. 395/700; 395/600; 395/650; 364/254.5; 364/255.1; 364/DIG. 1
[58] Field of Search .................................. 395/650, 700, 395/600

[56] References Cited

U.S. PATENT DOCUMENTS

| | | | |
|---|---|---|---|
| 5,093,914 | 3/1992 | Coplien et al. | 395/700 |
| 5,265,206 | 11/1993 | Shackleford et al. | 395/200 |
| 5,339,438 | 8/1994 | Conner et al. | 395/700 |
| 5,361,350 | 11/1994 | Conner et al. | 395/600 |

OTHER PUBLICATIONS

Borland C⁺⁺ 3.0, (Programmer's Guide),. Container Basics, 1991, p. 216.
Borland C⁺⁺ 3.0, User's Guide, 1991.
Borland C⁺⁺ 3.0, Library Reference, 1991.
Borland C⁺⁺ 3.0, Tools & Utilities Guide, 1991.

*Primary Examiner*—Kevin A. Kriess
*Assistant Examiner*—John Q. Chavis
*Attorney, Agent, or Firm*—John A. Smart

[57] ABSTRACT

An object-oriented development system of the present invention includes a language compiler having an optimizer for generating computer applications with improved speed and size. C++ optimization methods of the present invention are described, including virtual function and base optimization, using thunks for virtual member pointers, and passing classes by value. An object-oriented calling convention of the present invention, which affords rapid and efficient access to data and methods of objects, is also described.

13 Claims, 10 Drawing Sheets

```
class X { int i; long j;
public:
    X() { i=0; j=0; } init();
};

X::init() {
    for (i = 0; i < 25; i++)
        j += i;
}
```

NO OPTIM'S → ↙

-po OPTIM'S (BUT NOT FULL) → ↘

```
;
; X::init(); X::init()
;
push    bp
mov     bp,sp
;
; {
;   for(i = 0; i < 25; i++)
;
les     bx,dword ptr [bp+6]
mov     word ptr es:[bx],0
jmp     short @1@114
@1@58: @1@58:
;
; j += i;   ; j += i;
;
les     bx,dword ptr[bp+6]
mov     ax,word ptr es:[bx]
cwd
les     bx,dword ptr[bp+6]
add     word ptr es:[bx+2],ax
adc     word ptr es:[bx+4],dx
les     bx,dword ptr[bp+6]
inc     word ptr es:[bx]
@1@114:
les     bx,dword ptr[bp+6]
cmp     word ptr es:[bx],25
jl      short@1@58
;
; }
;
pop     bp
ret
```

```
;
;
;
push    bp          ⎫ FULL OPTIM
mov     bp,sp       ⎭ WOULD REMOVE
;
; {
;   for(i = 0; i < 25; i++)
;
mov     word ptr [si],0
jmp     short @1@114
;
;                   ACCESSING DS:SI
;                   WHICH WAS PASSED
;
mov     word ptr [si]
cwd add     word ptr [si+2],ax
adc     word ptr [si+4]],dx inc     word ptr [si]
@1@114:
cmp     word ptr [si],25
jl      short@1@58
;
; }
;
pop     bp          ⎫ FULL OPTIM
ret                 ⎭ WOULD REMOVE
```

*FIG. 7*

SYSTEM AND METHODS FOR OPTIMIZING OBJECT-ORIENTED COMPILATIONS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of computer systems and, more particularly, to systems and methods for compiling source programs, particularly object-oriented ones, into optimized object code.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks— the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. These languages allow data structures and algorithms to be expressed in a style of writing which is easily read and understood by fellow programmers.

A program called a "compiler" translates these instructions into the requisite machine language. In the context of this translation, the program which is written in the high-level language is called the "source code" or source program. The low-level or machine language, on the other hand, comprises "object code." Once created, object code (e.g., .obj file) is a separate program in its own right—it includes instructions which may be executed by the target microprocessor. In practice, however, the object code is usually first linked (i.e., combined) with other object code or libraries, which include standard routines.

Compilers are fundamental to modern computing. Translating human-oriented programming languages into computer-oriented machine languages, compilers allow computer programmers to ignore the machine-dependent details of machine language. Moreover, high-level languages are "portable," a feature which permits a single program to be implemented on several different machines, including ones of vastly different architecture. In this instance, the source program is "ported" (transferred) from one machine to another with little or no revision; instead, the program is simply re-compiled for each target machine. Thus, compilers allow programs and programming expertise to be machine-independent.

A compiler performs two basic tasks: analysis of the source program and synthesis of a machine-language program which instructs the computer to perform the task described by the source program. Most compilers are syntax driven, i.e., the compilation process is directed by the syntactic structure of the source program, as recognized by a compiler's parser. The parser builds the structure out of tokens, the lowest-level symbols used to define a programming language's syntax. This recognition of syntactic structure is a major part of the analysis task. Semantic routines actually supply the meaning (semantics) of the program, based on the syntactic structures. The semantic routines generate the target code or, optionally, some intermediate representation thereof.

Ideally, when a compiler translates a description of an application and maps it onto the underlying machine-level instruction set of a target processor, the resulting code should be at least as good as can be written by hand. In reality, code created by straightforward compilation rarely achieves its goal; instead, tradeoffs of slower performance and/or increased size of the executing application are usually incurred. While compilers simplify the task of creating meaningful programs, they rarely produce machine code which is not only the most efficient (smallest) in size but also executes the fastest.

Object-oriented programming languages (OOPL), such as C++, entail even further difficulties. In particular, data encapsulation, inheritance, and polymorphism—the main advantages of OOPL—all increase the difficulty of implementing optimizing techniques. As a result, optimization efforts to date have been largely restricted to straight procedural (e.g., C) compilers.

SUMMARY OF THE INVENTION

The present invention recognizes a need for providing an object-oriented development environment with an optimizing compiler. A system of the present invention includes a development environment having an optimizing compiler, a linker, and an interface. Through an interface (either command-line or UI driven), an application or system developer supplies source listings to the compiler. From the source listings (including header and include files), the compiler generates object module(s); these may be linked with other object modules or libraries to generate program executable by a target processor.

The optimizing compiler includes a translator, a code generator, and an optimizer. The optimizer provides code optimization methods for improving the speed and/or shrinking the size of a generated application. Methods of the optimizer include global register allocation, dead code elimination, common subexpression elimination, loop invariant code motion, copy propagation, pointer aliasing, induction variable analysis and strength reduction, loop compaction, structure copy inlining, code compaction, redundant load suppression, intrinsic function inlining, and register parameter passing. Additional C++ optimization methods are provided, including virtual function and base optimization, using thunks for virtual member pointers, and passing classes by value. A new object-oriented calling convention of the present invention is also provided for generating executable programs which rapidly and efficiently access data and methods of objects.

BRIEF DESCRIPTION OF THE DRAWINGS

FIG. 7 illustrates code generation with and without object-oriented calling convention of the present invention.

DETAILED DESCRIPTION OF A PREFERRED EMBODIMENT

General Architecture

Figure 1A:
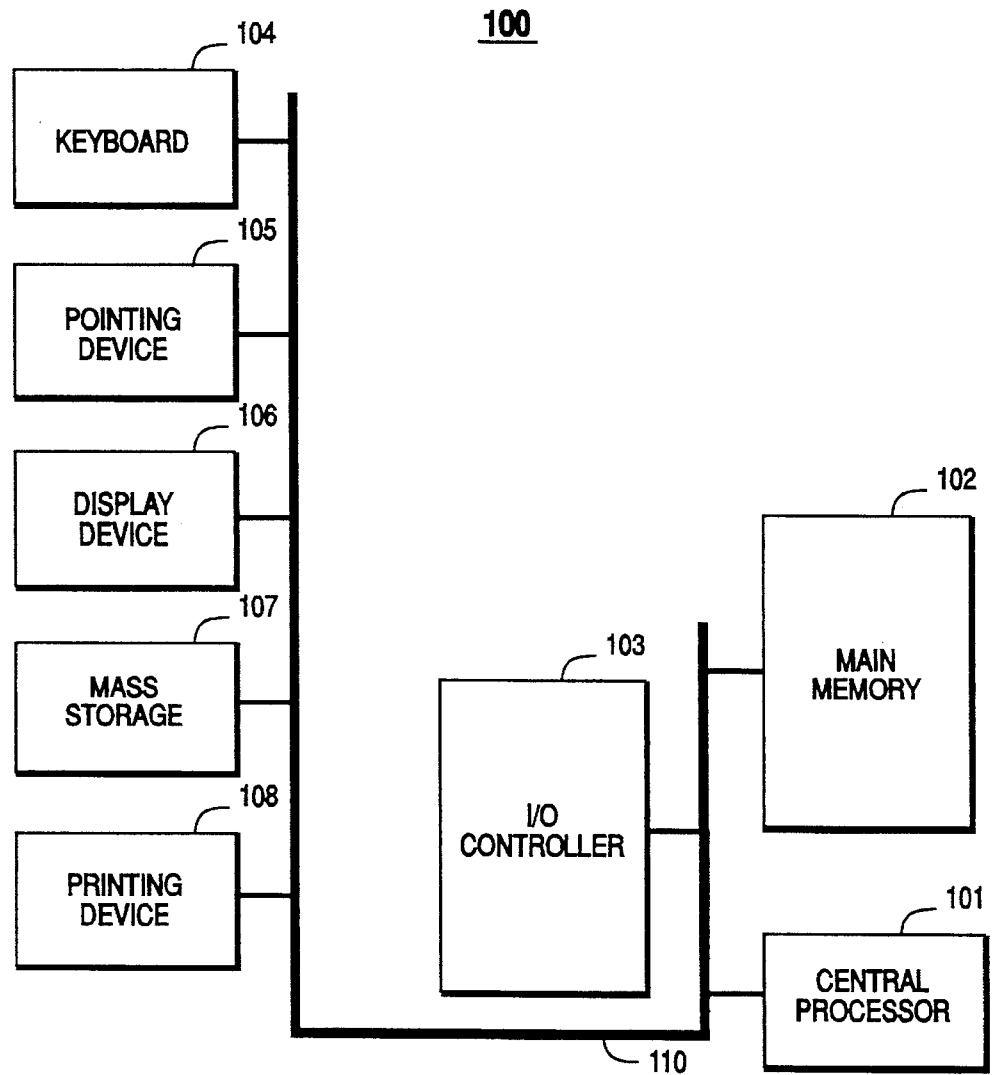
FIG. 1A is a block diagram of a computer system in which the present invention may be embodied.

The present invention may be embodied on a computer system such as the system 100 of FIG. 1, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be provided with the system 100 as desired. As shown, the various components of the system 100 communicate through a system bus 110 or similar architecture.

Figure 1B:
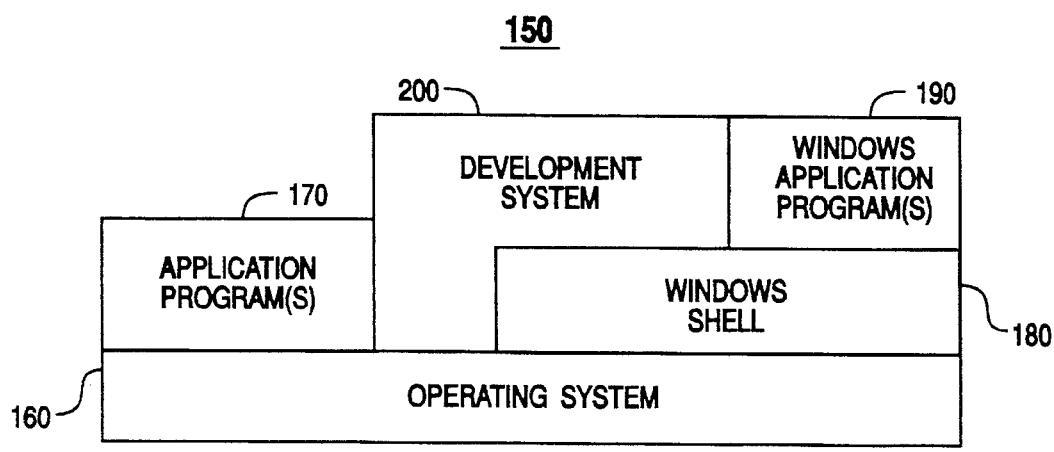
FIG. 1B is a block diagram of a software system for controlling the operation of the system of FIG. 1A.

Illustrated in FIG. 1B, a computer software system 150 is provided for programming the operation of the computer system 100. Software system 150, which is stored in system memory 102 and on disk memory 107, includes an kernel or operating system 160 and a windows shell or interface 180. One or more application programs, such as application programs 170 or windows applications programs 190, may be "loaded" (i.e., transferred from storage 107 into memory 102) for execution by the system 100. OS 160 and shell 180, as well as application software 170, 190, include an interface for receiving user commands and data and displaying results and other useful information.

Software system 150 also includes a development system 200 of the present invention for developing system and application programs. As shown, the development system 200 includes components which interface with the system 100 through windows shell 180, as well as components which interface directly through OS 160.

In a preferred embodiment, the system 100 is an IBM-compatible personal computer, available from a variety of vendors (including IBM of Armonk, N.Y.). Operating system 160 is MS-DOS and shell 180 is Microsoft Windows, both of which are available from Microsoft Corporation of Redmond, Wash.; alternatively, the system 100 may be implemented in other platforms, including Macintosh, UNIX, and the like. Development system 200 includes Borland C++, version 3.0, available from Borland International of Scotts Valley, Calif.. Application software 170, 190, on the other hand, can be any one of a variety of software applications, including word processing, database, spreadsheet, text editors, and the like.

Optimization

A. Introduction

The results of optimization are significant to both programmers and end users. Users receive programs optimized for speed, size, or both. Programmers, on the other hand, can write programs in a style that they find most convenient, not in the style that a computer finds most convenient. To achieve these results, optimization methods include techniques to:

1) Decrease the number of processor cycles required by the program;

2) Decrease the number of address calculations performed;

3) Minimize the number of memory fetches; and

4) Minimize the size of the generated object code.

To some extent, these goals may be achieved through "local" optimization. Local optimizations are improvements to small, mostly self-contained blocks of code, such as loops, switches, and "if-else" constructs. Local optimization techniques include elimination of common subexpressions and dead variables, movement of loop-invariant computations, and folding of constants into a single value.

Most programs contain more than just a series of isolated blocks, however. To produce still more efficient code, "global" optimization is required. This type of optimization occurs on a broader scale, with the optimizer seeking inefficiencies that affect multiple blocks. This task is considerably more difficult to achieve because of the more complex data flow analysis that must be performed by the compiler.

An optimizer basically aims at improving an application's speed and shrinking the size of executable files. The prime role of a compiler, on the other hand, is to check the source program's syntax and, if all is in order, generate object code that mirrors the intention of that source code. Being targeted at a particular microprocessor (or family), the object code is dependent on that microprocessor's instruction set and register architecture. Just as a programmer can code a given function in a variety of ways in a high level language, there are many different object code sequences which will achieve the same result. For a given microprocessor, an ideal mapping from source to object code is rarely if ever achieved. Some of these sequences may execute faster, usually at the expense of code size. Others will be smaller in size, but often at the expense of speed. Thus, a compromise often results.

B. Development System

Figure 2A:
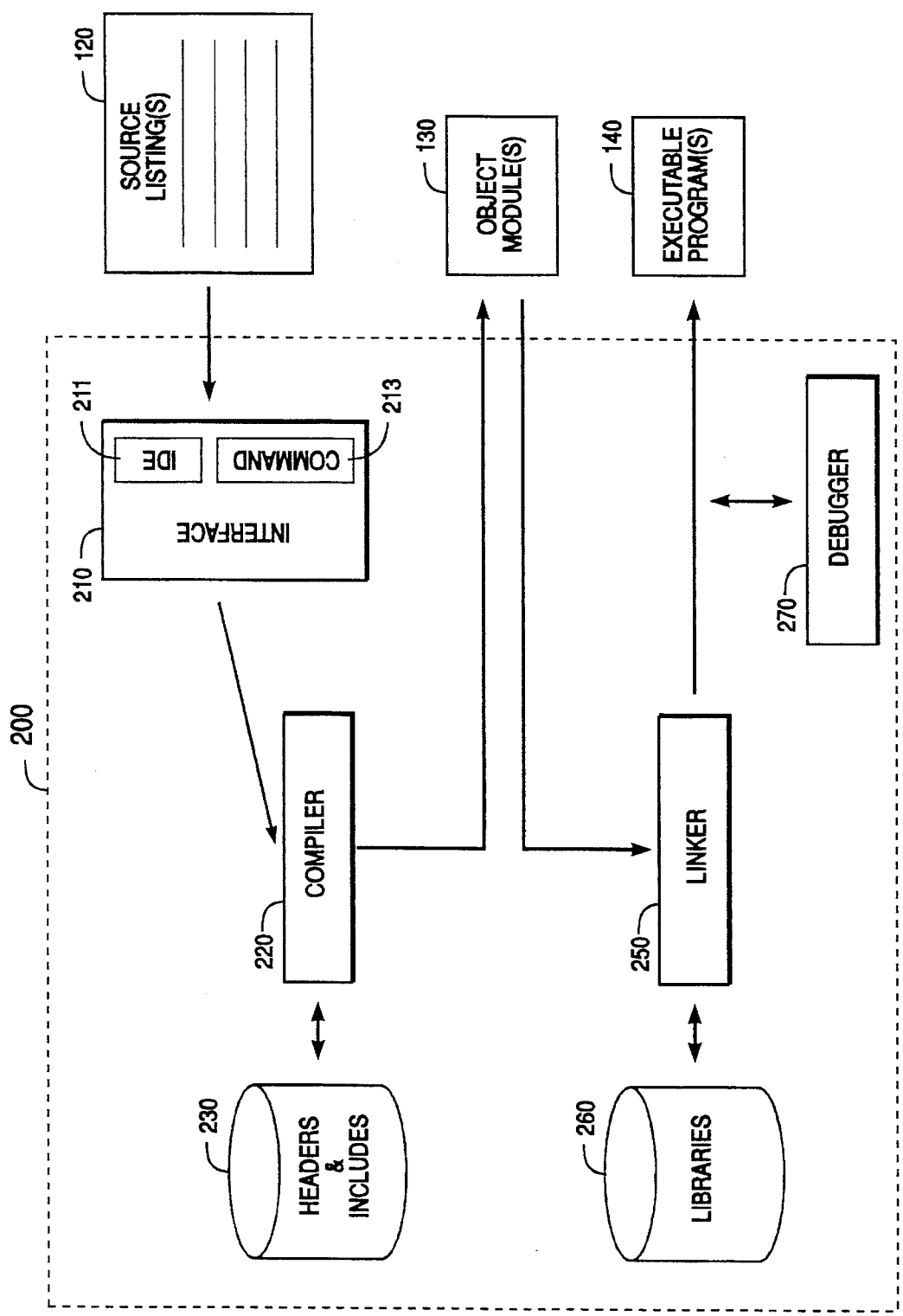
FIG. 2A is a block diagram of a development system of the present invention.
Figure 2B:
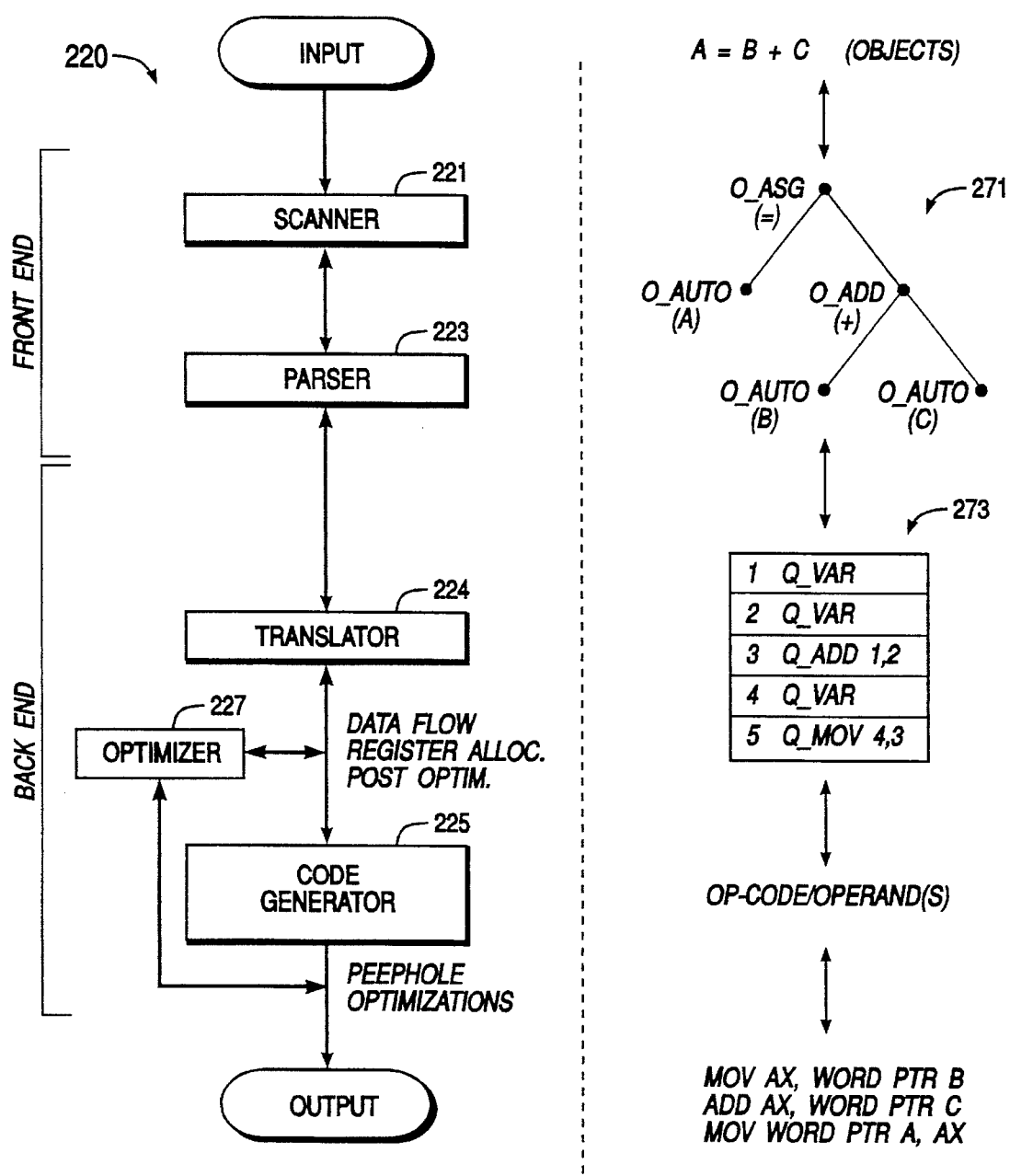
FIG. 2B is a block diagram of the optimizing compiler of FIG. 2A.

Shown in further detail in FIG. 2A–B, the development system of the present invention includes an optimizing compiler 220, a linker 250, and an interface 210. Through interface 210, the user or developer supplies source listings 120 to the compiler 220. Interface 210 includes both command-line driven 213 and Intergrated Development Environment (IDE) 211 interfaces, the former accepting user commands through command-line parameters, the latter providing menuing equivalents thereof. From the source code 120 and header/include files 230, the compiler 220 "compiles" or generates object module(s) 130. In turn, linker 250 "links" or combines the object modules 130 with libraries 260 (e.g., graphics, I/O routines, startup code, and the like) to generate program(s) 140, which may be executed by a target processor (e.g., processor 101 of FIG. 1). A debugging module 270 may be added, as desired, for eliminating errors in the programs 140.

Shown in further detail in FIG. 2B, the optimizing compiler 220 includes a front end and a back end. In particular, the front end includes a scanner 221 and a parser 223, while the back end includes a translator 224, a code generator 225, and an optimizer 227. In basic operation, the scanner 221 reads a source program and breaks it apart into a sequence of tokens, which include identifiers, delimiters, numbers, operators, and the like. In turn, the tokens are read by the parser 223, which understands the semantics of the source language. Given a formal syntax specification, such as a context-free grammar (CFG), the parser generates an intermediate representation (IR code) of the program, for example, by grouping tokens into units as specified by the syntax being used. In the syntax of the C programming language, for example, the expression A=B+C tells the computer to add the values of B and C together to obtain a new value, which is assigned to A. As shown, the IR code may be provided to the back end as a derivation tree 271, with the parsed tokens accessible from nodes of the tree.

Next, the IR code is passed to the back end of the compiler for code generation. Upon receiving this (e.g., by receiving a pointer to the expression tree 271), the translator 251 reduces the IR code into a table(s) 273 of triples (i.e., three-address representation) or, more preferably, quadruples (i.e., three-address representation with intermediate values referenced by explicit names). Using appropriate op-code lookup tables, these quads are then mapped by the code generator 225 into the object code performing the specified operations. For an introduction to the general construction and operation of compilers, see Fischer et al., *Crafting a Compiler with C*, Benjamin/Cummings Publishing Company, Inc., 1991, the disclosure of which is hereby incorporated by reference.

The basic operation of the compiler 220 is enhanced by the optimizer 227, which will now be described. Optimizer 227 provides code optimization methods for improving the speed and/or shrinking the size of a generated application. Preferably, the user controls what kinds of optimization he or she wants the compiler 220 to perform. In this manner, the programmer may program in the style which he or she finds most convenient.

In an exemplary embodiment of the present invention employing command-line interface 213, code optimizations are controlled through an —O command line option, followed by one or more of suboption letters (listed below). For example, —Oaxt turns on all speed optimizations and assumes no pointer aliasing. To disable or turn off optimizations, on the other hand, the user places a minus character before the optimization letter. For example, —O2—p would turn on all optimizations except copy propagation. As another example, —Od appearing on the command line after an —O2 would disable all optimizations. Some optimizations are also controlled by means other than —O switches. For example, —Z controls redundant load suppression.

Available optimization options in an exemplary command-line embodiment include (with equivalent menuing options also show):

| Parameter | Menu Option/Function |
|---|---|
| -O2 | Options ¦ Compiler ¦ Optimizations ¦ Full Speed<br>Generates the fastest code possible. This is the same as using the following command-line options: -O -Ob -Oe -Og -Oi -Ol -Om -Op -Ot -Ov -k- -Z |
| -O1 | Options ¦ Compiler ¦ Optimizations ¦ Full Size<br>Generates the smallest code possible. This is the same as using the following command-line options: -O -Ob -Oe -Os -k- -Z |
| -O | Options ¦ Compiler ¦ Optimizations ¦ Optimize Jumps<br>Removes jumps to jumps, unreachable code, and unnecessary jumps |
| -Oa | Options ¦ Compiler ¦ Optimizations ¦ Assume no pointer aliasing<br>Assume that pointer expressions are not aliased in common subexpression evaluation |
| -Ob | Options ¦ Compiler ¦ Optimizations ¦ Dead code elimination<br>Eliminates stores into dead variables |
| -Oc | Options ¦ Compiler ¦ Optimizations ¦ Common Subexpressions ¦ Optimize locally<br>Enables common subexpression elimination within basic blocks only. The -Oc option and the -Og option are mutually exclusive |
| -Od | Options ¦ Compiler ¦ Optimizations ¦ No Optimizing<br>Disables all optimizations. Note that this is not the same as -O-, which merely disables jump optimizations. |
| -Oe | Options ¦ Compiler ¦ Optimizations ¦ Global register allocation<br>Enables global register allocation and variable live range analysis |
| -Og | Options ¦ Compiler ¦ Optimizations ¦ Common Subexpressions ¦ Optimize globally<br>Enables common subexpression elimination within an entire function. The -Og option and the -Oc option are mutually exclusive |
| -Oi | Options ¦ Compiler ¦ Optimizations ¦ Inline intrinsics<br>Enables inlining of intrinsic functions such as memcpy, strlen, and the like. |
| -Ol | Options ¦ Compiler ¦ Optimizations ¦ Loop optimization<br>Compacts loops into REP/STOSx instructions |
| -Om | Options ¦ Compiler ¦ Optimizations ¦ Invariant code motion<br>Moves invariants code out of loops |
| -Op | Options ¦ Compiler ¦ Optimizations ¦ Copy propagation<br>Propagates copies of constants, variables, and expressions where possible |
| -Os | Options ¦ Compiler ¦ Optimizations ¦ Optimize for ¦ Size<br>Makes code selection choices in favor of smaller code |
| -Ot | Options ¦ Compiler ¦ Optimizations ¦ Optimize for ¦ Speed<br>Selects code in favor of executable speed |
| -Ov | Options ¦ Compiler ¦ Optimizations ¦ Induction Variables<br>Enables loop induction variable and strength reduction optimizations |
| -Ox | None<br>Enables most speed optimizations. This is provided for compatibility with other compilers (e.g., Microsoft C). |
| -Z | Options ¦ Compiler ¦ Optimizations ¦ Suppress redundant loads<br>Suppresses reloads of values which are already in registers |
| -pr | Options ¦ Compiler ¦ Entry/Exit Code ¦ Calling Convention ¦ Register<br>Enables the use of the __fastcall calling convention for passing parameters in registers |

From the selected option(s) and in conjunction with parser 223, optimizer 227 instructs code generator 225 in the generation of optimized object code. Additionally, a —po option is provided, as described in further detail hereinbelow.

C. Optimization Techniques

Principles of optimization, in accordance with the present invention, will now be described in further detail.

1. Global Register Allocation

Because memory references are computationally expensive in most systems, references are minimized through the intelligent use of registers. Global register allocation both increases the speed and decrease the size of generated applications. With optimizations enabled, the compiler 220 employs global register allocation when compiling the application.

2. Dead Code Elimination

Although the developer may never intentionally write code to do things which are unnecessary, the optimizer 220 may reveal possibilities to eliminate stores into variables which are not needed. Using the Ob option to remove stores into dead variables, the optimizer 227 creates a new variable to take the place of the expression a[j].

```
int goo(void), a[10];
int f(void) {
    int i, j;
    j = i = goo( );
    for ( j = 0; j < 10; j++ )
        a[j] = goo ( );
    return i;
}
```

This removes the code to store any result into the variable j, thus eliminating the need for it.

Since the optimizer should preferably determine where variables are no longer used and where their values are needed (live range analysis), the developer will typically use —Oe before using —Ob. Moreover, —Ob is preferably used whenever —Oe is used, since —Ob always results in smaller and faster code.

3. Common Subexpression Elimination

In common subexpression elimination, optimizer 227 finds duplicate expressions within a target scope, with the calculated value of those expressions stored once so as to avoid recalculating the expression. While this optimization may reduce code size, it mainly serves as a speed optimization technique.

The developer should preferably also use global common subexpression analysis if he or she wishes to reuse expressions rather than create explicit stack locations for them. For example, rather than code temp=t→n.o.left;

if (temp→op==O_ICON||temp→op==O_FCON) . . .
the developer could code if   (t→n.o.left→op==O_ICON||t→n.o.left→op==O_FCON) . . .
and let the optimizer 227 decide whether it is more efficient to create a temporary variable.

If, on the other hand, the developer finds that global common subexpression elimination creates too many temporaries for the developer's code size requirements, he or she can force common subexpression elimination to be done within groups of statements unbroken by jumps (basic blocks) by turning on local common subexpression elimination via the —Oc command-line option.

4. Loop Invariant Code Motion

Moving invariant code out of loops serves as a speed optimization. The optimizer 227 uses the information about all the expressions in a function gathered during common subexpression elimination to find expressions whose values do not change inside a loop. To prevent the calculation from being done many times inside the loop, the optimizer 227 moves the code outside the loop so that it is calculated only once. It then reuses the calculated value inside the loop.

Loop invariant code motion is used whenever the developer is compiling for speed and the developer has used global common subexpressions. For example, in the code below, x * y * z is evaluated in every iteration of the loop.

```
int v[10];
void f(void) {
    int i,x,y,z;
    for (i = 0; i < 10; i++)
        v[i] = x * y * z;
}
```

The optimizer 227 rewrites the code for the loop as:

```
int v[10];
void f(void) {
    int i,x,y,z,t1;
    t1 = x * y * z;
    for (i = 0; i < 10; i++)
        v[i] = t1;
}
```

Since unnecessary calculations within the loop are eliminated, substantial speed gains may be realized.

5. Copy Propagation

Propagating copies is primarily a speed optimization. Since it does not increase the size of the developer code, it is preferably used even when the developer has enabled —Og. Like loop invariant code motion, copy propagation relies on the analysis performed during common subexpression elimination. Copy propagation means that the optimizer 227 remembers the values assigned to expressions and uses those values instead of loading the value of the assigned expressions. Copies of constants, expressions, variables, and the like may be propagated.

In the following code, for example, the constant value 5 is used in the second assignment instead of the expression on the right side.

```
PtrParIn->IntComp = 5;                          // 1st assign
( *( PtrParIn->PtrComp ) )      .IntComp =      // 2nd assign
    PtrParIn->IntComp;                          // use 5 instead
```

6. Pointer Aliasing

While not strictly an optimization, pointer aliasing affects the way the optimizer performs common subexpression elimination and copy propagation. When pointer aliasing is enabled, it allows the optimizer 227 to maintain copy propagation information across function calls and maintain common subexpression information across some stores. Otherwise, the optimizer should preferably discard information about copies and subexpressions in these situations. Since pointer aliasing might lead to errors or bugs which are hard to spot, it is preferably applied only when the developer uses —Oa.

The parameter —Oa controls how the optimizer 227 treats expressions which contain pointers. When compiling with global or local common subexpressions and —Oa enabled, the optimizer 227 will assume that pointer expressions are not aliased in common subexpression evaluation and recognize
   *p*x
as a common subexpression, for example, as shown in the following function, foo:

```
ing g, y;
int foo(int *p){
    int x=5;
    y = *p * x;
    g = 3;
    return (*p * x);
}
```

If not employed correctly, however, an error may result, for example:

```
void goo(void) {
    g=2;
    foo(&g);      /*   This is incorrect, since the
                       assignment g = 3
                       invalidates the expression *p * x */
}
```

—Oa also controls how the optimizer treats expressions involving variables whose address has been taken. When compiling with —Oa, the compiler assumes that assignments via pointers will only affect those expressions involving variables whose addresses have been taken and which are of the same type as the left hand side of the assignment in question.

To illustrate this concept, consider the following function.

```
int y, z;
int f(void) {
    int x;
    char *p = (char *)&x;
    y = x * z;
    *p = 'a';
    return (x*z);
}
```

When compiled with —Oa, the assignment *p='a' will not prevent the optimizer 227 from treating x*z as a common subexpression, since the destination of the assignment, *p, is a char, whereas the addressed variable is an int. When compiled without —Oa, the assignment to *p prevents the optimizer from creating a common subexpression out of x*z.

7. Induction Variable Analysis and Strength Reduction

Creating induction variables and performing strength reduction are speed optimizations performed on loops. The optimizer 227 employs induction to create new variables out of expressions used inside a loop; these variables are called "induction variables." The optimizer 227 assures that the operations performed on these new variables are computationally less expensive (reduced in strength) than those used by the original variables.

Opportunities for these optimizations are common if the developer uses array indexing inside loops (since a multiplication operation is required to calculate the position in the array which is indicated by the index). For example, in the code:

```
int v[10];
void f(void) {
    int i,x,y,z;
    for (i = 0; i < 10; i++)
        v[i] = x * y * z;
}
``` the optimizer 227 creates an induction variable out of the operation v[i], since the v[i] operation would require a multiplication. The induction variable also eliminates the need to preserve the value of i. Thus with —Ov enabled, the optimizer 227 changes this code to the following:

```
int v[10];
void f(void) {
    int i,x,y,z, *p;
    for (p = v; p < &v[10]; p++)
        *p = x * y * z;
}
```

Preferably, the developer will use —Ov whenever he or she is compiling for speed in source code which contains loops.

8. Loop Compaction

Loop compaction takes advantage of the instruction set of 80×86 processors by replacing the code for a loop with an equivalent string move instruction. For example, for the code:

```
int v[100];
void t(void) {
    int i;
    for (i = 0; i < 100; i++)
        v[i] = 0;
}
``` the compiler 220 generates the following machine instructions:

```
mov    cx,100
mov    di,offset DGROUP:_v
push   ds
pop    es
mov    ax,0
rep    stosw
``` which benefits from the rep stosw instruction of the 80×86.

Preferably, the developer will use –Ol to compact loops whenever he or she is generating code for speed. Depending on the complexity of the operands, the compacted loop code may also be smaller than the corresponding non-compacted loop.

9. Structure Copy Inlining

Inlining of structure copies provides substantial optimization when compiling for speed. When the developer enables —Ot, the compiler 220 determines whether it can safely generate code to perform a rep movsw instruction instead of calling a helper function to do the copy. For structures and unions of over 8 bytes in length, performing this optimization produces faster structure copies than the corresponding helper function call.

10. Code Compaction

In contrast to structure copy inlining, code compaction provides substantial optimization when compiling for size. In code compaction, the optimizer scans the generated code for duplicate sequences. When such sequences warrant, the optimizer replaces one sequence of code with a jump to the other, thereby eliminating the first piece of code. SWITCH statements contain the most opportunities code compaction.

11. Redundant Load Suppression

Load suppression is both a speed and size optimization. When —Z is enabled, the optimizer keeps track of the values it loads into registers and suppresses loads of values which it already has in a register. For example, when compiling the following code with —Z enabled (and with copy propagation turned off), the optimizer 227 specifies that the value of *x which has been loaded is pushed into ES:BX instead of reloading the same value:

```
void f(void) {
    int *x = 5;
    goo(*x);
}
```

The developer should preferably use this optimization whenever he or she is compiling with the optimizer enabled.

12. Intrinsic Function Inlining

There are times when the developer would like to use one of the common string or memory functions, such as strcpy() or memcmp(), but he or she does not want to incur the overhead of a function call. By using —Oi, the compiler 220 generates the code for these functions within the developer function's scope, eliminating the need for a function call. At the expense of size, the resulting code executes faster than a call to the same function.

Functions which are inlined when —Oi is enabled include:

| | | |
|---|---|---|
| memchr | strcmp | strrchr |
| memcmp | strcpy | rotl |
| memcpy | strlen | rotr |
| memset | strncat | fabs |
| stpcpy | strncmp | alloca |
| strcat | strncpy | |
| strchr | strnset | |

The developer can also control the inlining of each of these functions with the #pragma intrinsic. For example, pragma intrinsic strcpy would cause the compiler 220 to generate code for strcpy in the developer's function.

pragma in trinsic -strcpy would prevent the compiler from inlining strcpy. Using these pragmas in a file will override the command-line switches or IDE options used to compile that file.

When inlining, the compiler actually creates a macro which renames the inlined function to a function which the compiler internally recognizes. When inlining any intrinsic function, therefore, the developer should preferably include a prototype for that function before he or she uses it. In the above example, the compiler would create a macro define strcpy __strcpy__ where, the compiler 220 recognizes calls to functions with two leading and two trailing underscores and tries to match the prototype of that function against its own internally stored prototype. If the developer did not supply a prototype or the one supplied does not match the compiler's internal prototype, the compiler should reject the attempt to inline that function and generate an error.

13. Register Parameter Passing

The command line interface includes a "__fastcall" calling convention. Functions declared using this modifier expect parameters to be passed in registers. The compiler 220 treats this calling convention (i.e., __fastcall modifier) as a new language specifier, such as "__cdecl" and "__pascal". Functions declared with either of these two language modifiers should not also have the __fastcall modifier, since they use the stack to pass parameters. Likewise, the __fastcall modifier should not be used together with __export and __loads. The compiler generates a warning if the developer try to mix functions of these types, including inappropriate uses of the __fastcall modifier. The developer may, however, use functions with the __fastcall convention in overlaid modules (e.g., VROOMM™ available from Borland International).

A preferred maximum of three parameters may be passed in registers to any one function. The developer should preferably not assume that the assignment of registers will reflect the ordering of the parameters to a function. According to the present invention, the preferred registers used for each parameter type may be summarized as follows:

Parameter Type Registers

| | |
|---|---|
| character (signed and unsigned) | AL, DL, BL |
| integer (signed and unsigned) | AX, DX, BX |
| long (signed and unsigned) | DX:AX |
| near pointer | AX, DX, BX |

Far pointer, union, structure, and floating point (float and double) parameters are pushed on the stack.

Functions declared with the __fastcall modifier have different names than their non-__fastcall counterparts. The compiler prefixes the __fastcall function name with an "@". This prefix applies to both unmangled C function names and to mangled C++ function names.

D. C++ Optimization Techniques

Optimizer 227 also implements several C++ specific optimizations in a fashion transparent to the programmer. In a preferred embodiment, available techniques include virtual function and base optimizations, using thunks for virtual member pointers, and passing classes by value. Additionally, a new calling convention is provided. Each of these will now be described in further detail.

1. Virtual Function and Base Optimizations

When calling virtual functions or accessing virtual base classes, the compiler 220 binds the function or base class address at compile time whenever it is able to determine statically (at compile time) the true type of the object being accessed. For example, given the sample code:

```
struct    foo
{
          virtual    void    func( );
          double             member;
          foo( );
          foo(foo&);
          ~foo( );
};
extern    foo    x;
extern    foo    *p;
void      (foo::*mp) ( );
void      f(foo);
void      func( )
{
          x.func( );        // virtual fn bound statically
          (p->*mp) ( );     // member ptr call -> uses thunk
          f(x);             // pass class 'x' by value
}
``` the compiler 220 generates the following code for x.func:

```
mov     ax,offset DGROUP:_x
push    ax
call    near ptr @foo@funcSqv    ; static binding of foo::func
pop     cx
```

As demonstrated by the example, this method of the present invention generates code which is not only smaller but also faster.

Figure 3:
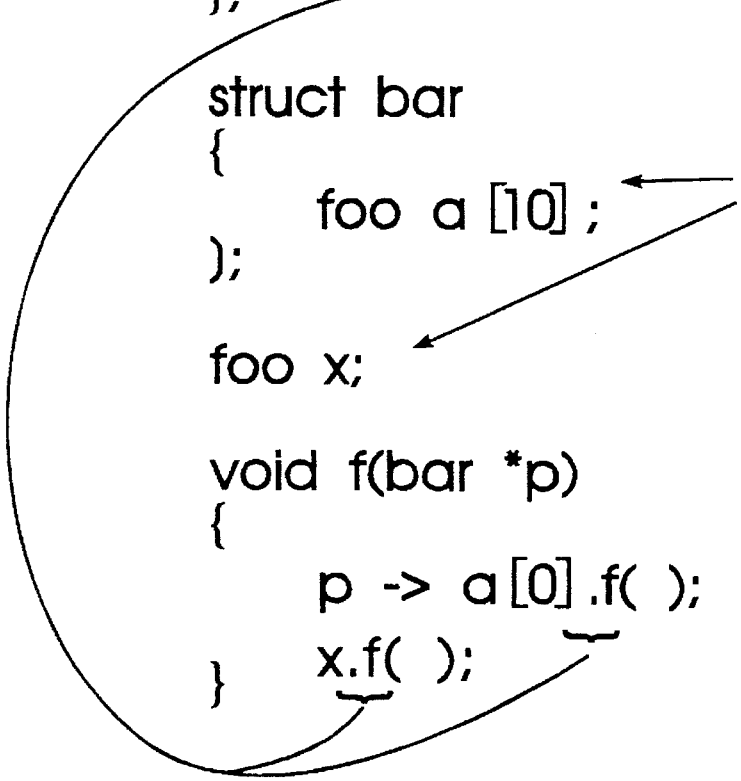
FIG. 3 is a program listing illustrating the static (i.e., determined at compile time) access of a virtual function.

As shown in FIG. 3, the optimization may be extended to arrays which are known to the compiler, such as those declared in the source listing as being an "array" (as opposed to a mere block of memory accessed through a pointer). In the function:

```
struct foo
{
        virtual void f( );
};
struct bar
{
        foo a[10];        // declare an array of type "foo"
};
foo x;                    // declare a global of type "foo"
void f(bar *p)
{
        p -> a[0].f( );   // access statically
        x.f( );
}
```

As declared, "a" is known to the compiler to be an array of type "foo". Thus, the access to the virtual function f() may be made statically, i.e., without accessing the function through the dynamic dispatch mechanism (Virtual Dispatch Table) which may be computationally more expensive.

2. Using Thunks for Virtual Member Pointers

For pointers to function members of classes, instead of encoding explicitly (in the member pointer value) whether the member being pointed to is a virtual function, the information is implicitly encoded through the use of virtual call thunks. Using the example code shown above, the following code is generated by compiler 220 for the member pointer call (p→*mp)():

```
push  word ptr DGROUP:_p
call  word ptr DGROUP:_mp;    call the thunk
pop   cx
```

In this instance, the thunk pointed to by the member pointer will appear as:

```
@Svcl$NNN0$1$0S            segment    virtual
@@Svcl$NNN0$1$0S           label      word
      mov    bx,sp
      mov    bx, ss:[bx+2]
      mov    bx, [bx+0]
      jmp    word ptr ds:[bx]
@Svcl$NNN0$1$0S            ends
```

In contrast, explicit encoding for the member pointer call would require, for example:

```
        mov   ax,word ptr DGROUP:_p
        add   ax,word ptr DGROUP:_mp
        push  ax
        cmp   word ptr DGROUP:_mp+2,0
        je short @1@74
        mov   bx,word ptr DGROUP:_p
        add   bx,word ptr DGROUP:_mp
        add   bx,word ptr DGROUP:_mp+4
        mov   bx,word ptr [bx]
        mov   ax,word ptr DGROUP:_mp+2
        dec   ax
        add   bx,ax
        mov   ax,word ptr [bx]
        jmp   short @1@98
@1@74:
        mov   ax,word ptr DGROUP:_mp+4
@1@98:
        call  ax
        pop   cx
```

Thus, the method of the present invention employs smaller member pointers. As a result, more efficient calls may be made through them.

3. Passing Classes by Value

When an argument of type class with user-defined constructors is passed by value to a function, one might pass a reference to a temporary instead, with the caller assuming responsibility for destroying this temporary, if needed. This is illustrated in the following code, generated for the call f(x) in the example above:

```
mov    ax,offset DGROUP:_x
push   ax
lea    ax,word ptr [bp-10]
push   ax
call   near ptr @foo@SbctrSqr3foo    ; create temporary
pop    cx
pop    cx
lea    ax,word ptr [bp-10]
push   ax
call   near ptr @fSq3foo             ; call f
pop    cx
mov    ax,2
push   ax
lea    ax,word ptr [bp-10]
push   ax
```

```
        call    near ptr @foo@$bdtr$qv      ; destroy temporary
        pop     cx
        pop     cx
```

In a preferred embodiment of the present invention, however, compiler 220 copy-constructs the argument value directly to the stack, with the callee assuming responsibility for destruction of this value, as shown in the following generated code for f(x):

```
        sub     sp,10                       ; make room on stack
        mov     ax,offset DGROUP:_x
        push    ax
        lea     ax,word ptr [bp-10]
        push    ax
        call    near ptr @foo@$bctr$qr3foo  ; create x
        pop     cx
        pop     cx
        call    near ptr @f$q3foo           ; call f (f destroys x later)
        add     sp,10
```

Figure 4:
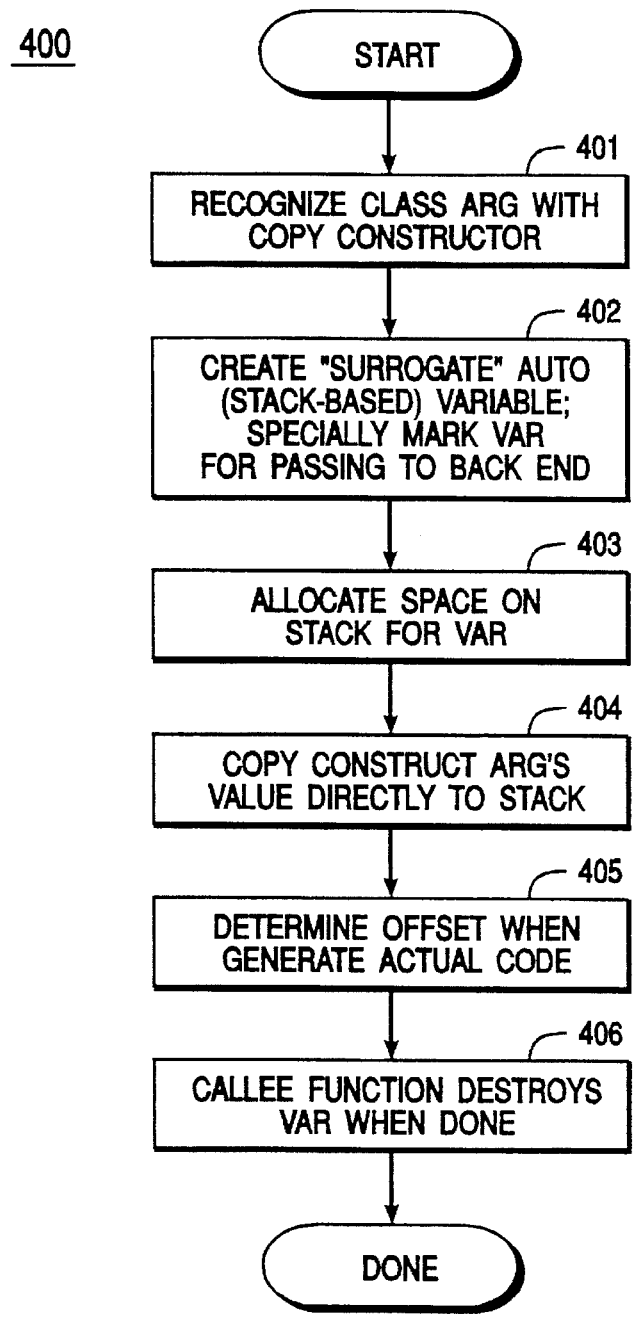
FIG. 4 is a flowchart illustrating a method of the present invention for passing classes by value.

Illustrated with a flowchart 400 in FIG. 4, the steps of this method will now be described in further detail. In step 401, the front end of the compiler 220 recognizes a class argument with a copy constructor. In step 402, a "surrogate" automatic (i.e., stack-based) variable is created. This variable is distinguished from normal automatic variables, by a unique prefix for example, so that the back end will recognize it as a surrogate automatic. In step 403, space is allocated on the stack for the surrogate, with the argument's value copy constructed directly into this allocated space in step 404. In step 405, determination of the offset (i.e., BP offset) of the surrogate within the stack frame is deferred until code actually referencing the surrogate is generated. Step 406 is included to indicated that the callee function preferably assumes responsibility for cleaning up the stack after returning control to the caller; alternatively, the caller may assume this responsibility. In this fashion, the function call overhead (both in terms of code and stack space) is reduced. Moreover, quicker access to the argument inside the called function is afforded as well.

4. Object-Oriented Calling Convention

The present invention includes a new calling convention "Object Data" providing true "object-oriented" code generation for Intel 80x86-compatible microprocessors and the like. Optimizing the access of object data, the calling convention significantly increases the speed of programs, while reducing code size (e.g., 20 percent or more). While applicable to both 16-bit DOS and Microsoft Windows programs, the calling convention is especially effective in reducing the size of the latter.

Figure 5A:
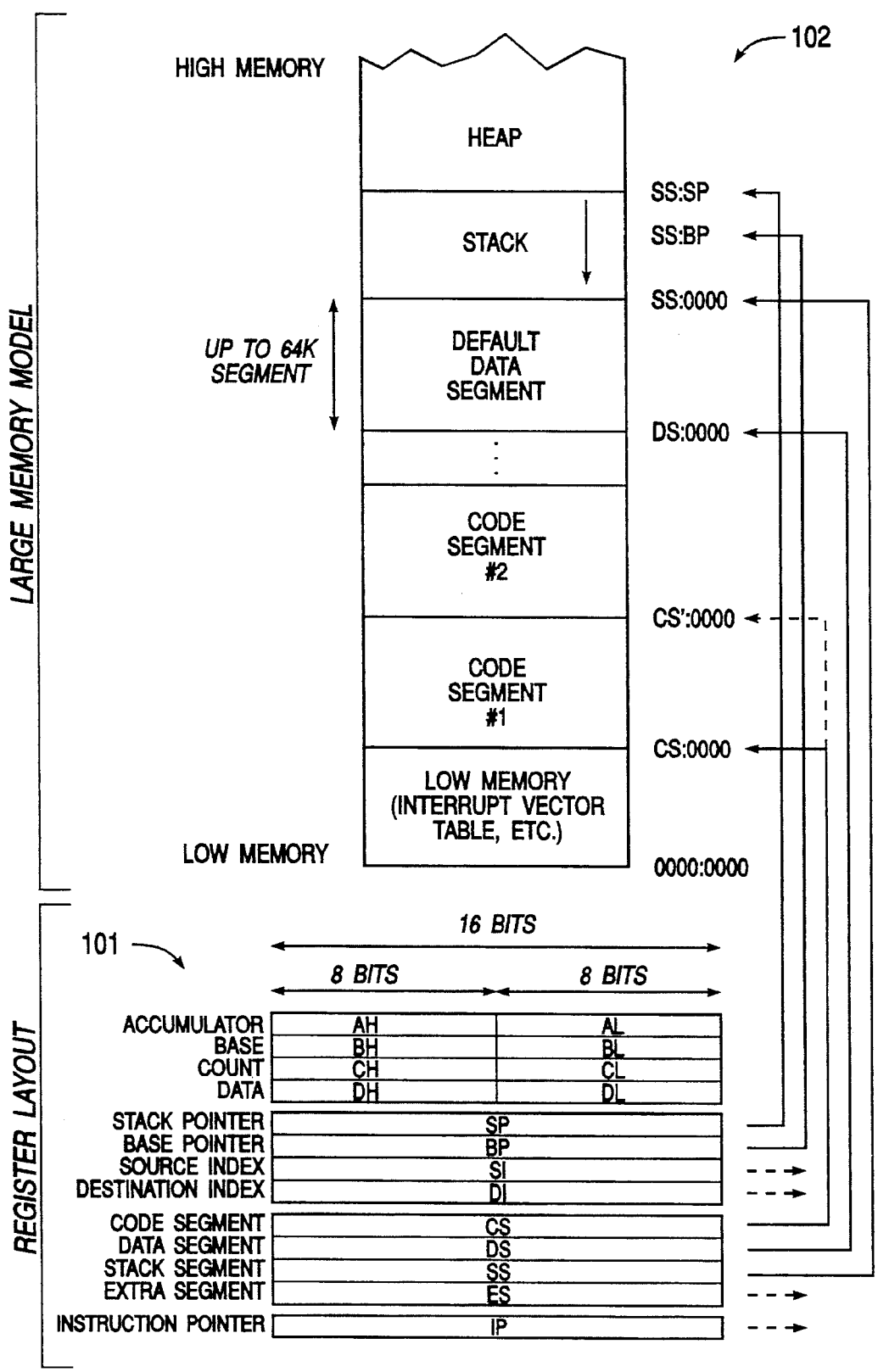
FIGS. 5A–C are block/schematic diagrams of various memory/CPU register configurations which illustrate an objected-oriented calling convention of the present invention.

To understand the benefits of the Object Data calling convention, it is first helpful to examine the general organization of functionally-oriented programs, for example, as shown in FIG. 5A for a large memory model on an 80x86-compatible architecture. In traditional, non-object oriented languages, a program basically references two types of variables: global and local. As shown, compilers have placed the global data constructs for an executable program into a data segment of memory 102, with references to individual data members achieved through a data segment or "DS" register of CPU 101. The local variables, on the other hand, are created on the "stack" (last-in, first-out segment of memory 102); references to these data members are achieved through the stack segment or SS register of CPU 101. The general layout of 80x86 architecture (including memory configuration for tiny, small, medium, compact, and huge memory models) is documented in the technical literature. See e.g., Hummel, R., *Programmer's Technical Reference: The Processor & Coprocessor*, Ziff-Davis Press, 1992; the disclosure of which is hereby incorporated by reference. Additional description is appended herewith in Appendix C, *Programmer's Guide:* DOS Memory Management (Chapter 9).

Instead of just two data types, object-oriented programming includes three types: global data, local data, and object data. The latter two data types—object data and local data—are the most important: the impetus of "object-oriented programming" is to get developers to focus on the data and functions at the object level, not at the global level. Recognizing this, the present invention provides an "object-oriented memory model" which shifts the focus of a memory model to the objects.

Figure 5B:
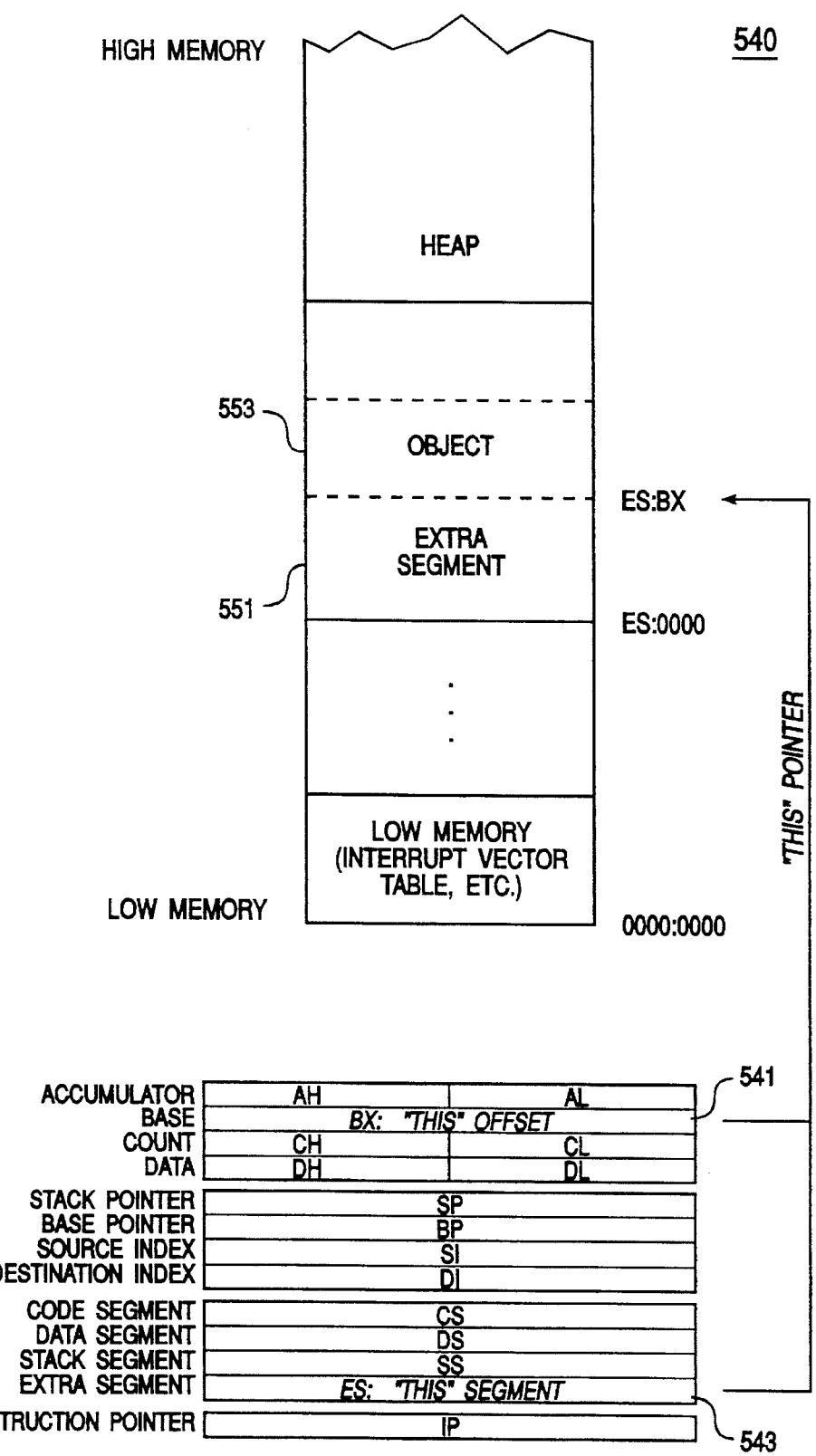

Nonetheless, conventional compilers emit code as if global data and local data were the most important data, with references to object data incurring a substantial penalty. Referring to FIG. 5B, this problem will be illustrated. In a large memory model 540 implemented with conventional technology, for example, whenever the programmer references object data, he or she loads a self-referential pointer to the object (the "this" or "self" pointer, which is implicitly declared by the language) into the ES:BX register pair for dereferencing the object. Specifically, the "data segment" or high-order word of the pointer is loaded into ES register 543 and the "offset" or low-order word is loaded into BX register 541.

Figure 5C:
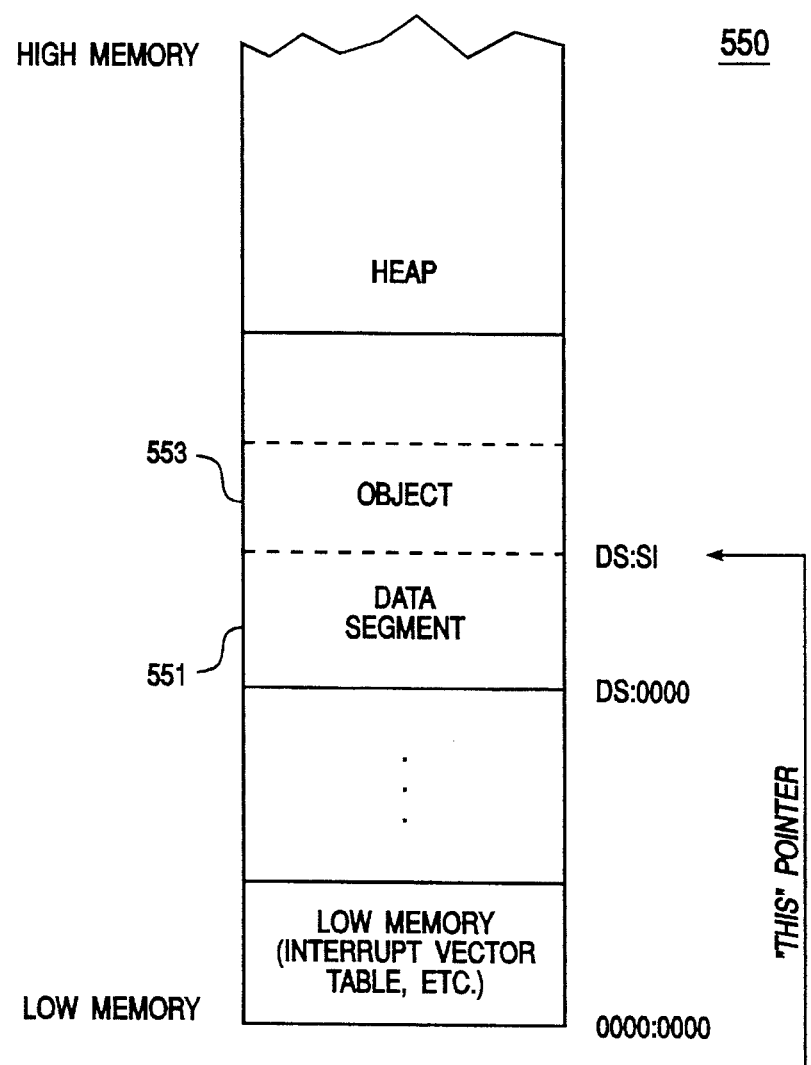
Figure 5C:
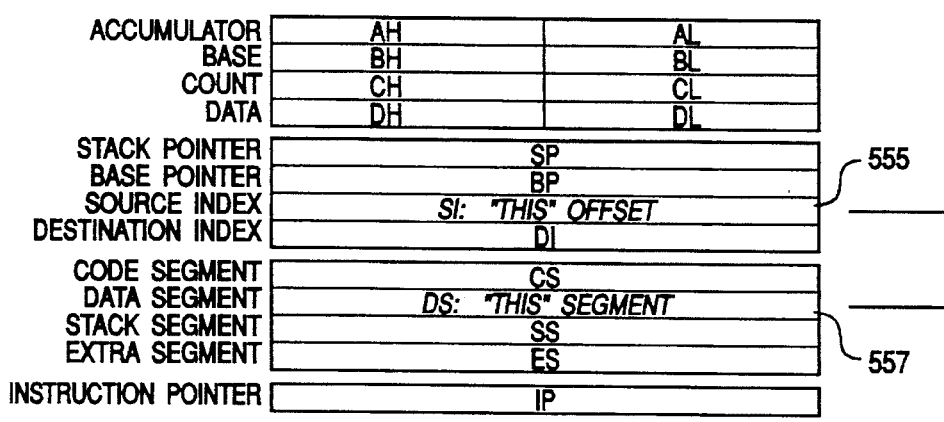

Shown in FIG. 5C, organization of the object-oriented memory model of the present invention will be described. As shown, the "this" pointer is automatically placed into a <data segment addressing register>:<indexing register> pair, such as the DS:SI register pair. Specifically in a preferred embodiment, the segment portion of the address reference is stored in DS register 557, with the offset portion loaded into SI register 555. From the DS:SI register pair, a memory address may be formed for accessing the physical locations of the memory (e.g., an 80x86 20-bit address). In an alternative, less preferred embodiment, the offset may be stored in another indexing register (e.g., DI or BX).

In a preferred embodiment, the calling convention is invoked by default, or at least when object-oriented constructs (e.g., class definitions and object declarations) are encountered by the compiler 220. In the instance where the calling convention has been turned off, one may employ an appropriate identifier or function modifier for instructing the compiler and linker to employ the Object Data calling convention to selected classes and/or their member functions An identifier of "__fastThis", "__nearThis" or "__objectData" is employed for this purpose; case sensitivity may be adapted as required for one's particular environment. When applied to a class, the modifier causes the calling convention to be employed with all member functions of that class. Alternatively, one may apply the modifier to just selected member functions, with the calling convention only employed for those selected ones. Use of the modifier is analogous to the invocation of the C calling convention with "__cdecl" or the Pascal calling convention with "__pascal". Unlike the other two, however, __objectData does not mandate how arguments are passed; thus, it may be used in addition to (not in lieu of) these and other calling conventions, including __fastcall.

In addition to the above function modifier, a developer may employ pragma statements to achieve selective or global use of _objectData. For example, the calling convention may be enabled with:

pragma -po or disabled with:

pragma -po-

All told, the developer has complete flexibility in controlling the use of the calling convention in his or her program.

Figure 6:
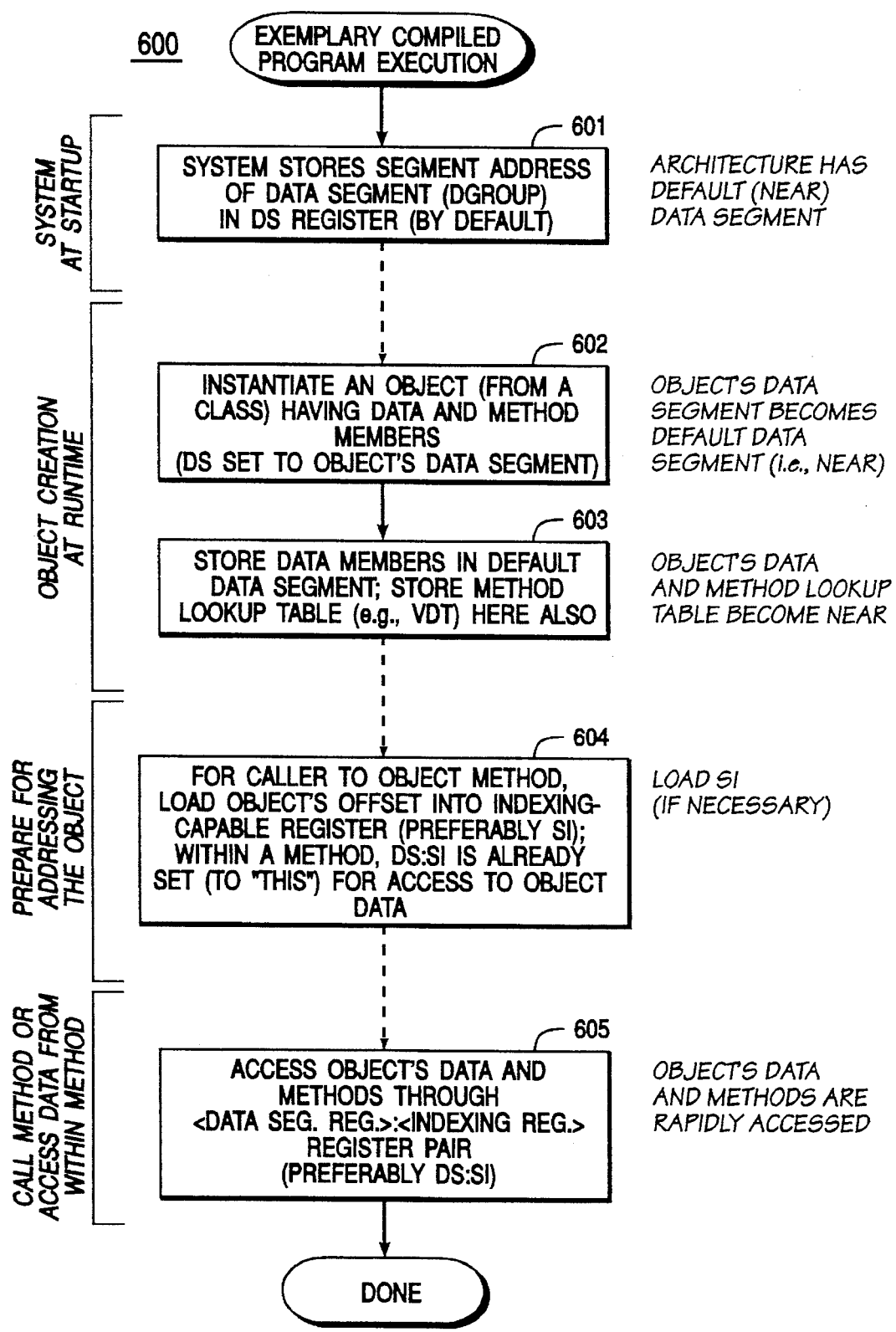
FIG. 6 is a flowchart illustrating the object-oriented calling convention of the present invention operative within an executing program (generated by the compiler of FIG. 2B).

Illustrated with a flowchart 600 in FIG. 6, a method for employing the calling convention of the present invention, such as exemplified by an executing application compiled by the development system 200, will now be described. While not actually a required step, step 601 is shown to illustrate that in a segmented architecture, such as the system 100, a default data segment is associated with a particular segment-addressing register. In the Intel 80×86 platform, for example, a program commonly stores the segment address of a particular data segment of memory in the DS register at startup (e.g., ASSUME DS:DGROUP).

Steps 602 and 603 illustrate actual object creation at runtime (similar methodology may be applied for staticly created objects as well). In step 602 an object is instantiated from a defined class, the object including both methods and data members of its class. Access to members may be private, protected, or public as is specified by C++ member access control; see e.g., Ellis M. and Stroustrup B., *The Annotated C++ Reference Manual*, Addison-Wesley, 1990, the disclosure of which is hereby incorporated by reference. In step 603, the data member(s) of the object are stored in the default data segment in memory 102 (whose segment address has already been loaded into the DS register at startup). Information for accessing methods of the object (e.g., dispatch tables) is preferably stored here as well.

After creation of an object, it may now be accessed by the system; specifically, methods of the object may be called (according to program-specified access control) and data of the object may be accessed (typically, restricted to access by member functions or methods). As shown by step 604, for example, access to the object's methods or data is desired. At step 605, the system prepares for addressing (i.e., accessing) the object. As will be recalled from step 603, the data segment addressing register (DS) already stores the segment address of the object (i.e., high-order word of "this" pointer).

The offset to the object (i.e., lower-order word of "this" pointer), on the other hand, is dealt with as follows. For accessing a method of the object (i.e., calling a method of the object), the object's offset is loaded into an indexing register, most preferably the SI register. For accessing data of the object, however, the offset is in fact already loaded in SI (as it is to be accessed by a method of the object). Similar instances of SI already being loaded may include member functions calling each other and/or themselves (recursion).

Finally, at step 606, actual access to the object's methods and data members is achieved by deferencing the desired object member with the DS:SI register pair. Accesses to additional data members and/or methods may be conveniently and rapidly accomplished, for example by using based-indexed (such as [BX+SI]) addressing, as desired.

Referring now to FIG. 7, code generation for the _objectData calling convention will be illustrated. Given the code snipet:

```
// ***********************************************************
```

-continued

```
// DEMO.CPP
// When optimized, to be compiled with -po -ml -Vf -O
class X
{
    int i;
    long j;
public:
    X() { i = 0; j = 0; }
    init();
};
X::init()
{
    for(i = 0; i < 25; i++)
        j += i;
}
// ***********************************************************
```

A conventional compiler might generate the following assembler code (e.g., BC++ non -po version):

```
;***********************************************************
    .286p
    ifndef      ??version
?debug  macro
    endm
publicdll  macro    name
    public   name
    endm
$comm   macro   name,dist,size,count
    comm dist name:BYTE:count*size
    endm
    else
$comm   macro   name,dist,size,count
    comm dist name[size]:BYTE:count
    endm
    endif
    ?debug      V 300h
    ?debug      S "DEMO.cpp"
    ?debug      C E9FC71BD18096A6F686E732E637070
DEMO_TEXT    segment byte public 'CODE'
DEMO_TEXT    ends
DGROUP     group    _DATA,_BSS
    assume cs:DEMO_TEXT,ds:DGROUP
_DATA     segment word public 'DATA'
d@        label   byte
d@w       label   word
_DATA     ends
_BSS segment word public 'BSS'
b@        label   byte
b@w       label   word
_BSS    ends
DEMO_TEXT    segment byte public 'CODE'
;
; X::init()
;
    assume   cs:DEMO_TEXT
@X@0init$qv    proc far
    push bp
    mov bp,sp
;
; {
;       for(i = 0; i < 25; i++)
;
    les    bx,dword ptr [bp+6]
    mov    word ptr es:[bx],0     ; *** ES segment overrides here
                                   & below
    jmp    short @1@114
@1@58:
;
;           j += i;
;
    les    bx,dword ptr [bp+6]
    mov    ax,word ptr es:[bx]
    cwd
    les    bx,dword ptr [bp+6]
    add    word ptr es:[bx+2],ax
```

```
          adc     word ptr es:[bx+4],dx
          les     bx,dword ptr [bp+6]
          inc     word ptr es:[bx]
@1@114:
          les     bx,dword ptr [bp+6]
          cmp     word ptr es:[bx],25
          jl      short @1@58
;
; }
;
          pop     bp
          ret
@X@0init$qv     endp
          ?debug  C E9
          ?debug  C FA00000000
DEMO_TEXT       ends
_DATA     segment word public 'DATA'
s@        label     byte
_DATA     ends
DEMO_TEXT       segment byte public 'CODE'
DEMO_TEXT       ends
          public  @X@0init$qv
_s@       equ     s@
          end
;************************************************************
```

As seen, the inefficient technique of multiple ES segment overrides is employed.

Even with present day optimizing C++ compilers, such as Microsoft C/C++ 7.0, the results of the present invention are not obtained:

```
;************************************************************
;    compiled with MSC/C++ 7.0 version
;    Static Name Aliases
;
          TITLE     DEMO.cpp
          .8087
INCLUDELIB  LLIBCE
INCLUDELIB  OLDNAMES.LIB
DEMO_TEXT   SEGMENT WORD PUBLIC 'CODE'
DEMO_TEXT   ENDS
_DATA       SEGMENT WORD PUBLIC 'DATA'
_DATA       ENDS
CONST       SEGMENT WORD PUBLIC 'CONST'
CONST       ENDS
_BSS SEGMENT WORD PUBLIC 'BSS'
_BSS ENDS
DGROUP      GROUP   CONST, _BSS, _DATA
            ASSUME DS: DGROUP, SS: DGROUP
DEMO_TEXT   SEGMENT
            ASSUME CS: DEMO_TEXT
            PUBLIC  ?init@X@@RECXXZ     ; X::init
?init@X@@RECXXZ    PROC FAR     ; X::init
; Line 11
            push    bp
            mov     bp,sp
;    this = 6
            mov     bx,WORD PTR [bp+6]     ;this
; Line 12
            mov     es,WORD PTR [bp+8]
            mov     WORD PTR es:[bx],0     ; Loading "this"
            mov     ds,WORD PTR [bp+8]
            ASSUME DS: NOTHING
$F342:
; Line 13
            mov     ax,WORD PTR [bx]
            cwd
            add     WORD PTR [bx+2],ax
            adc     WORD PTR [bx+4],dx
            inc     WORD PTR [bx]
            cmp     WORD PTR [bx],25       ;0019H
            jl      $F342
; Line 14
            push    ss
```

```
            pop     ds
            ASSUME DS: DGROUP      ; *** Must restore DS
            mov     sp,bp
            pop     bp
            ret     4
            nop
?init@X@@RECXXZ    ENDP
DEMO_TEXT       ENDS
END
;************************************************************
```

As shown, accessing object data in this fashion with DS requires restoring DS—computationally, a very expensive operation (e.g., 20 or more cycles on a '386 processor).

Code generation in accordance with the present invention, on the other hand, would yield (BC++ -po version):

```
;************************************************************
          .286p
          ifndef    ??version
?debug    macro
          endm
publicdll macro     name
          public    name
          endm
$comm     macro     name,dist,size,count
          comm dist name:BYTE:count*size
          endm
          else
$comm     macro     name,dist,size,count
          comm dist name[size]:BYTE:count
          endm
          endif
          ?debug    V 300h
               ?debug    S "DEMO.cpp"
          ?debug    C E9FC71BD18096A6F686E732E637070
DEMO_TEXT    segment byte public 'CODE'
DEMO_TEXT    ends
DGROUP       group     _DATA,_BSS
             assume cs:DEMO_TEXT,ds:DGROUP
_DATA        segment word public 'DATA'
d@           label     byte
d@w          label     word
_DATA        ends
_BSS segment word public 'BSS'
b@           label     byte
b@w          label     word
_BSS         ends
DEMO_TEXT    segment byte public 'CODE'
;
; X::init()
;
             assume cs:DEMO_TEXT
@X@2init$qv    proc far
;
; {
;     for(i = 0; i < 25; i++)
;
             mov     word ptr [si],0     ; *** No overrides required
             jmp     short @1@86
@1@30:
;
;         j += i;
;
             mov     ax,word ptr [si]
             cwd
             add     word ptr [si+2],ax
             adc     word ptr [si+4],dx
             inc     word pty [si]
@1@86:
             cmp     word ptr [si],25
             jl      short @1@30
;
; }
;
```

-continued

```
        ret
@X@2initSqv    endp
        ?debug  C E9
        ?debug  C FA00000000
DEMO_TEXT      ends
_DATA   segment word public 'DATA'
s@      label   byte
_DATA   ends
DEMO_TEXT      segment byte public 'CODE'
DEMO_TEXT      ends
        public  @X@2initSqv
_s@     equ     s@
        end
;************************************************************
```

Thus in contrast to conventional or present-day optimizing techniques, the object-oriented calling convention of the present invention allows an executing program to readily access an object. In particular, since an object's "this" pointer is already set up in DS:SI, one does not have to resort to an ES override (i.e., defeating the processor's normal use of a default segment base in DS) to access an object's methods or data members. Nor does one have to restore from an old DS. Access to virtual methods is particularly improved as the Virtual Dispatch Table, residing as near data, is immediately accessible from the "this" pointer which is stored in DS:SI.

As a further advantage, base-indexed address mode (i.e., [BX+SI] addressing) is preserved for accessing an object's data members and virtual table, thus allowing one to employ this powerful memory reference technique for addressing complex data structures. In addition, since the Object Data calling convention does not mandate how arguments are passed, it may be used in conjunction with other calling conventions, including __fastcall and C (i.e., __cdecl) calling conventions.

The calling convention of the present invention is particularly effective in reducing the size of Microsoft Windows programs. Specifically, one may advantageously employ the characteristic of Microsoft Windows that it does not routinely expect DS to be set to DGROUP. Standard C functions, in contrast, do rely on DS being set to DGROUP:

```
push    ds
mov     ax,DGROUP
mov     ds,ax           ; Computationally expensive!
``` do call, then before returning:

pop DS ; Computationally expensive!

In the instance of calling the Windows API (e.g., CreateWindow), Windows API functions may be prototyped such that they load their own DS (e.g., __loadds). In this manner, the computationally expensive segment register loads may be avoided. Other libraries may be prototyped in a similar fashion, as applicable. All told, the object-oriented memory model of the present invention employs Intel 80×86-compatible architecture most efficiently for object-oriented programming, both reducing a program's size and increasing its execution speed.

5. Object-Oriented Calling Convention and Multiple Inheritance

According to the present invention, for multiple inheritance virtual calls a stub is generated which adjusts the 'this' pointer to be the correct one for the called member function.

This is called a generic "stub." For example, for:

struct X {virtual void f(void)=0; };

struct Y {};

struct Z: public Y, public X {virtual void f (void); };

void main(void) {Z a;} the following stub is generated:

mov bx, sp add word ptr ss:[bx+<offset>+<distModifier>],<adjustment> jmp <far or near> ptr <sym>

For object-oriented code generation (-po), a more efficient stub is generated:

add si , <adjustment> jmp <far or near> ptr <sym>

For multiple, virtual inheritance with virtual function calls and a user-specified constructor, the compiler 220 preferably generates a stub to adjust the 'this' pointer when the virtual function is called. For example, the following code would need such a stub.

```
struct X { virtual void f(void) = 0; };
struct Y { };
struct Z: public Y, public virtual X
{
    Z();
    virtual void f(void);
};
Z::Z() { }
```

Exemplary instructions generated are:

```
mov     bx,sp
les     bx, dword ptr ss:[bx+4]    ;; load 'this' into es:bx
mov     ax, es:[bx-2]              ;; load vtable displacement
add     ax, 65529                  ;; add adjustment
mov     bx,sp
add     ss:[bx+4], ax              ;; add adjustment to 'this'
jmp     far ptr @Y@1barSqv         ;; jump to targetSym
```

For object-oriented code generation, this will include:

```
mov     ax,[si-2]                  ;; load vtable pointer
add     ax, 65529                  ;; add <adjustment>
                                   ;; (it's negative)
add     si,ax
jmp     far ptr @Y@1barSqv         ;; jump to targetSym
```

More preferably, this is achieved in three instructions, as follows:

```
mov     bx,[si-2]
lea     si,[si+bx+65529]
jmp     far ptr @Y@1barSqv
```

C++ member pointers to virtual functions may employ a thunk to get the correct virtual function to call. For example, the following code requires a thunk.

struct X
{

-continued

```
        virtual f();
};
(X::*p) () = &X::f;
```

The compiler 220 generates a code sequence, such as (here the virtual table is far):

mov bx, sp les bx, ss: [bx+4]

les bx, es: [bx+0]

jmp dword ptr es: [bx]

Alternatively, in object-oriented code generation, a thunk like the following may be generated:

```
les bx,[si+0]           ; 0 is the vptrOffset
jmp dword ptr es:[bx]   ; 0 is the vtblOffset
```

Attached hereto is an Appendix A containing trace listings of code generation for passing classes by value, which provide a description of the invention operative in a general purpose digital computer system, such as an IBM-compatible personal computer. Also attached hereto is an Appendix B containing additional source listings illustrating code generation employing the object-oriented calling convention of the present invention in the instance of multiple inheritance. Finally, user and programmer guides and additional reference materials providing additional description for the development system of the present invention are appended as Appendix C.

While the invention is described in some detail with specific reference to a single preferred embodiment and certain alternatives, there is no intent to limit the invention to that particular embodiment or those specific alternatives. For example, while methods of the present invention have been illustrated in conjunction with 16-bit registers, those skilled in the art will appreciate that these methods are also operative in architectures of 32-bit, 48-bit, 64-bit, and the like. While the preferred embodiment has been described with reference to an Intel 80×86-compatible architecture, the methods of the present invention may be advantageously applied to other systems, particularly object-oriented ones embodied in segmented architectures. Moreover, those skilled in the art will appreciate that the principles of the present invention may readily be employed in systems having virtual memory addressing schemes (e.g., 80386 and 80486). Thus, the true scope of the present invention is not limited to any one of the foregoing exemplary embodiments but is instead defined by the following claims.

Appendix A

Trace:

```
Cast to 'long' Expression at ccp.cpp(5):
[338f:00be]         O_IND '*'                     [type=long]
[338f:0076]             O_ICON                    [type=unsigned int]
constant = 4
[338f:009a]         O_ADD '+'                     [type=long *]
[338f:002e]             O_PARAM                   [type=long *] 'x'

Cast to 'long' Expression at ccp.cpp(5):
[338f:0202]         O_IND '*'                     [type=long]
[338f:01ba]             O_PARAM                   [type=long *] 'x'

Cast to 'unsigned int' Expression at ccp.cpp(5):
[338f:038e]         O_ICON                        [type=unsigned int]
constant = 8

Cast to 'foo *' Expression at ccp.cpp(11):
[338f:05f2]         O_ADR '&'                     [type=foo *]
[338f:05ce]             O_AUTO                    [type=foo] '<temp>'
[334e008e]

Initialized:    Expression at ccp.cpp(11):
[338f:06ee]         O_PARAM_CPP                   [type=foo] arg =
'<temp>'[334e00ae]
[338f:063a]                 O_ADR '&'             [type=foo &]
[338f:05aa]                     O_PARAM           [type=foo] 'x'
[338f:065e]             O_ARG                     [type=void]
[338f:05f2]                 O_ADR '&'             [type=foo *]
[338f:0712]                     O_AUTO            [type=foo] '<temp>'
[334e00ae]
[338f:06a6]         O_CALL                        [type=foo *]
[338f:0682]             O_ID                      [type=foo *(foo &)]
'foo::foo(foo &)'

Statement Expression at ccp.cpp(11):
[338f:06ee]         O_PARAM_CPP                   [type=foo] arg =
'<temp>'[334e00ae]
[338f:063a]                 O_ADR '&'             [type=foo &]
[338f:05aa]                     O_PARAM           [type=foo] 'x'
[338f:065e]             O_ARG                     [type=void]
[338f:05f2]                 O_ADR '&'             [type=foo *]
[338f:0712]                     O_AUTO            [type=foo] '<temp>'
[334e00ae]
[338f:06a6]         O_CALL                        [type=foo *]
[338f:0682]             O_ID                      [type=foo *(foo &)]
'foo::foo(foo &)'
[338f:0736]         O_CALL                        [type=void]
[338f:0562]             O_ID                      [type=void(foo)]
'func(foo)'

Cast to 'long' Expression at ccp.cpp(5):
[338f:080e]         O_IND '*'                     [type=long]
[338f:07c6]             O_ICON                    [type=unsigned int]
constant = 4
[338f:07ea]         O_ADD '+'                     [type=long *]
[338f:077e]             O_PARAM                   [type=long *] 'x'

Cast to 'long' Expression at ccp.cpp(5):
[338f:0952]         O_IND '*'                     [type=long]
[338f:090a]             O_PARAM                   [type=long *] 'x'

Optimized Expression at ccp.cpp(11):
[338f:06ee]         O_PARAM_CPP                   [type=foo] arg =
'<temp>'[334e00ae]
[338f:0bfe]                 O_ADR '&'             [type=foo *]
```

```
[338f:0c22]                    O_AUTO           [type=foo] '<temp>'
[334e00ae]
[338f:06a6]             O_SEQ ','               [type=foo *]
[338f:0a4e]                 O_CAST '()'         [type=void]
[338f:0bda]                    O_PARAM          [type=long] 'x'
[338f:0a2a]                   O_ASG '='         [type=long]
[338f:0b92]                    O_AUTO           [type=long] '<temp>' + 4
[334e00ae]
[338f:0a72]             O_SEQ ','               [type=void]
[338f:08c2]                 O_CAST '()'         [type=void]
[338f:0b4a]                    O_PARAM          [type=long] 'x' + 4
[338f:089e]                   O_ASG '='         [type=long]
[338f:0b02]                    O_AUTO           [type=long] '<temp>'
[334e00ae]
[338f:0736]       O_CALL                        [type=void]
[338f:0562]          O_ID                       [type=void(foo)]
'func(foo)'

Cast to 'foo *' Expression at ccp.cpp(12):
[338f:0c6a]          O_ADR '&'                  [type=foo *]
[338f:0c46]             O_PARAM                 [type=foo] 'x' op Q_PUSHI
LEFT: AM_REG seg 0x base 0xa index 0x off 0
RIGHT: AM_NONE seg 0x base 0x index 0x off 0
DEST: AM_NONE seg 0x base 0x index 0x off 0
op Q_MOVI
LEFT: AM_REG seg 0x base 0xa index 0x off 0
RIGHT: AM_REG seg 0x base 0xb index 0x off 0
DEST: AM_NONE seg 0x base 0x index 0x off 0

Variables

[2] x(6e) vn 0 T_STRUCT SC_PARM off 4 [total refs 7] VF_NIXREG
[28] <temp>(ae) vn 0 T_STRUCT SC_AUTO [total refs 4] VF_ARGPARAM
VF_NIXREG
[4e] func(e7) vn 0 T_FUNC SC_GLOBAL VF_NIXREG
[74] }(f4) vn 0 T_FUNC SC_EXTERN VF_NIXREG
Function func
stmtList <12,2>
12</22>: SK_BSCOPE nest 1 addr 0 scope
22<12/32>: SK_QUADS nest 1 addr 0 1[27]
------------ line #11 -------
    2: int[Q_SPILL, 4181]
    3: sym[Q_ARGPARAM, v0 <temp>(ae)]
    4: int[Q_CLEANUP, 65528]
    5: sym[Q_VARL, DX, Word, v0 x(6e)+6] QF_USED
    6: sym[Q_VARI, AX, Word, v0 x(6e)+4] QF_USED
    7: sym[Q_VARL, v0 <temp>(ae)+2] QF_AMODE QF_DEF QF_USED
    8: sym[Q_VARI, v0 <temp>(ae)] QF_AMODE QF_DEF QF_USED
    9: op [Q_MOVI, 7, 5] QF_ASGOP
   10: op [Q_MOVI, 8, 6] QF_ASGOP
   11: sym[Q_VARL, DX, Word, v0 x(6e)+2] QF_USED
   12: sym[Q_VARI, AX, Word, v0 x(6e)] QF_USED
   13: sym[Q_VARL, v0 <temp>(ae)+6] QF_AMODE QF_DEF QF_USED
   14: sym[Q_VARI, v0 <temp>(ae)+4] QF_AMODE QF_DEF QF_USED
   15: op [Q_MOVI, 13, 11] QF_ASGOP
   16: op [Q_MOVI, 14, 12] QF_ASGOP
   17: sym[Q_OFF, v0 <temp>(ae)]
   18: op [Q_REGI, 15, 0]
   19: sym[Q_CALL, v0 func(e7)+1055]
   20: int[Q_CLEANUP, 8]
   21: int[Q_SPILL, 4181]
   22: int[Q_INTI, AX, Int, 2] QF_USED
   23: op [Q_PUSHI, 22, 0]
   24: sym[Q_OFF, AX, Int, v0 x(6e)] QF_USED
   25: op [Q_PUSHI, 24, 0]
```

```
        26: sym[Q_CALL, v0 }(f4)+1055]
        27: int[Q_CLEANUP, 4]
32<22/2>: SK_ESCOPE nest 1 addr 0 scope stmt 12
2<32/>: SK_LABEL nest 1 addr 0 loopHead = 0
op Q_SUBI
LEFT: AM_REG seg 0x base 0xb index 0x off 0
RIGHT: AM_ICON seg 0x base 0xb index 0x off 8
DEST: AM_NONE seg 0x base 0x index 0x off 0
op Q_MOVI
LEFT: AM_REG seg 0x base 0x2 index 0x off 0
RIGHT: AM_ADDRESS seg 0xffff base 0xa index 0xffff off 10
DEST: AM_NONE seg 0x base 0x index 0x off 0
op Q_MOVI
LEFT: AM_REG seg 0x base 0x index 0x off 0
RIGHT: AM_ADDRESS seg 0xffff base 0xa index 0xffff off 8
DEST: AM_NONE seg 0x base 0x index 0x off 0
op Q_MOVI
LEFT: AM_ADDRESS seg 0xffff base 0xa index 0xffff off -6
RIGHT: AM_REG seg 0xffff base 0x2 index 0xffff off 0
DEST: AM_NONE seg 0x base 0x index 0x off 0
op Q_MOVI
LEFT: AM_ADDRESS seg 0xffff base 0xa index 0xffff off -8
RIGHT: AM_REG seg 0xffff base 0x index 0xffff off 0
DEST: AM_NONE seg 0x base 0x index 0x off 0
op Q_MOVI
LEFT: AM_REG seg 0xffff base 0x2 index 0xffff off -8
RIGHT: AM_ADDRESS seg 0xffff base 0xa index 0xffff off 6
DEST: AM_NONE seg 0x base 0x index 0x off 0
op Q_MOVI
LEFT: AM_REG seg 0xffff base 0x index 0xffff off -8
RIGHT: AM_ADDRESS seg 0xffff base 0xa index 0xffff off 4
DEST: AM_NONE seg 0x base 0x index 0x off 0
op Q_MOVI
LEFT: AM_ADDRESS seg 0xffff base 0xa index 0xffff off -2
RIGHT: AM_REG seg 0xffff base 0x2 index 0xffff off 0
DEST: AM_NONE seg 0x base 0x index 0x off 0
op Q_MOVI
LEFT: AM_ADDRESS seg 0xffff base 0xa index 0xffff off -4
RIGHT: AM_REG seg 0xffff base 0x index 0xffff off 0
DEST: AM_NONE seg 0x base 0x index 0x off 0
op Q_CALL
LEFT: AM_ADDRESS seg 0xffff base 0xffff index 0xffff func off 0
RIGHT: AM_NONE seg 0xffff base 0x index 0xffff off 0
DEST: AM_NONE seg 0x base 0x index 0x off 0
op Q_ADDI
LEFT: AM_REG seg 0xffff base 0xb index 0xffff func off 0
RIGHT: AM_ICON seg 0xffff base 0x index 0xffff off 8
DEST: AM_NONE seg 0x base 0x index 0x off 0
op Q_MOVI
LEFT: AM_REG seg 0xffff base 0x index 0xffff func off 0
RIGHT: AM_ICON seg 0xffff base 0xffff index 0xffff off 2
DEST: AM_NONE seg 0x base 0x index 0x off 0
op Q_PUSHI
LEFT: AM_REG seg 0xffff base 0x index 0xffff off 0
RIGHT: AM_NONE seg 0xffff base 0xffff index 0xffff off 2
DEST: AM_NONE seg 0x base 0x index 0x off 0
op Q_LEA
LEFT: AM_REG seg 0xffff base 0x index 0xffff off 0
RIGHT: AM_ADDRESS seg 0xffff base 0xa index 0xffff off 4
DEST: AM_NONE seg 0x base 0x index 0x off 0
op Q_PUSHI
LEFT: AM_REG seg 0xffff base 0x index 0xffff off 0
RIGHT: AM_NONE seg 0xffff base 0xa index 0xffff off 4
DEST: AM_NONE seg 0x base 0x index 0x off 0
op Q_CALL
LEFT: AM_ADDRESS seg 0xffff base 0xffff index 0xffff } off 0
RIGHT: AM_NONE seg 0xffff base 0xa index 0xffff off 4
```

```
DEST: AM_NONE seg 0x base 0x index 0x off 0
op Q_POPI
LEFT: AM_REG seg 0xffff base 0x6 index 0xffff } off 0
RIGHT: AM_NONE seg 0xffff base 0xa index 0xffff off 4
DEST: AM_NONE seg 0x base 0x index 0x off 0
op Q_POPI
LEFT: AM_REG seg 0xffff base 0x6 index 0xffff } off 0
RIGHT: AM_NONE seg 0xffff base 0xa index 0xffff off 4
DEST: AM_NONE seg 0x base 0x index 0x off 0
op Q_POPI
LEFT: AM_REG seg 0xffff base 0xa index 0xffff } off 0
RIGHT: AM_NONE seg 0xffff base 0xa index 0xffff off 4
DEST: AM_NONE seg 0x base 0x index 0x off 0
op Q_RET
LEFT: AM_NONE seg 0xffff base 0xa index 0xffff } off 0
RIGHT: AM_NONE seg 0xffff base 0xa index 0xffff off 4
DEST: AM_NONE seg 0x base 0x index 0x off 0
block at 0, size = 3, jcc = 256, jtarget = 818
block at 3, size = 46, jcc = 256, jtarget = 591
block at 49, size = 2, jcc = 256, jtarget = 179
```

Appendix B

```
*********************************************************************
Snippet #2 struct X
{
    virtual int f(int);
    int main(void);
};

int X::f(int n)
{
    if (n==0)
        return 1;

return(f(n-1)*n);
} int X::main(void)
{
    X *a;

return a->f(16);
}

*********************************************************************
BC++ non -po version
*********************************************************************
     .286p
     ifndef    ??version
?debug   macro
     endm
publicdll macro      name
     public    name
     endm
$comm    macro     name,dist,size,count
     comm dist name:BYTE:count*size
     endm
     else
$comm    macro     name,dist,size,count
     comm dist name[size]:BYTE:count
     endm
     endif
     ?debug    V 300h
         ?debug    S "DEMO2.cpp"
     ?debug    C E9207CC3180A6A6F686E73322E637070
DEMO2_TEXT    segment word public 'CODE'
DEMO2_TEXT    ends
DGROUP   group    _DATA,_BSS
     assume   cs:DEMO2_TEXT,ds:DGROUP
_DATA     segment word public 'DATA'
d@   label     byte
d@w  label     word
_DATA     ends
_BSS segment word public 'BSS'
b@   label     byte
b@w  label     word
_BSS ends
DEMO2_TEXT    segment word public 'CODE'
     ;
     ; int X::f(int n)
     ;
         assume   cs:DEMO2_TEXT
@X@0f$qi  proc far
     mov  ax,DGROUP
     inc  bp
     push bp
     mov  bp,sp
```

```
    push ds
    mov  ds,ax
    push si
    mov  si,word ptr [bp+10]
;
; {
;       if (n==0)
;
    or   si,si
    jne  short @1@86
;
;           return 1;
;
    mov  ax,1
    jmp  short @1@114
@1@86:
;
;
;       return(f(n-1)*n);
;
    mov  ax,si
    dec  ax
    push ax
    push word ptr [bp+8]
    push word ptr [bp+6]
    les  bx,dword ptr [bp+6]
    les  bx,dword ptr es:[bx]
    call dword ptr es:[bx]
    add  sp,6
    imul si
@1@114:
;
; }
;
    pop  si
    pop  ds
    pop  bp
    dec  bp
    ret
@X@0f$qi  endp
;
; int X::main(void)
;
        assume   cs:DEMO2_TEXT
@X@0main$qv    proc far
    mov  ax,DGROUP
    inc  bp
    push bp
    mov  bp,sp
    push ds
    mov  ds,ax
    sub  sp,4
;
; {
;     X *a;
;
;     return a->f(16);
;
    push 16
    push word ptr [bp-4]
    push word ptr [bp-6]
    les  bx,dword ptr [bp-6]
    les  bx,dword ptr es:[bx]
    call dword ptr es:[bx]
    add  sp,6
;
; }
```

```
;
    pop     cx
    pop     cx
    pop     ds
    pop     bp
    dec     bp
    ret
@X@0main$qv    endp
    ?debug  C E9
    ?debug  C FA00000000
DEMO2_TEXT    ends
_DATA     segment word public 'DATA'
s@   label    byte
_DATA     ends
DEMO2_TEXT    segment word public 'CODE'
DEMO2_TEXT    ends
    public  @X@0main$qv
    public  @X@0f$qi
_s@  equ  s@
    end

*********************************************************************
BC++ -po version
*********************************************************************
    .286p
    ifndef  ??version
?debug    macro
    endm
publicdll macro    name
    public  name
    endm
$comm     macro    name,dist,size,count
    comm dist name:BYTE:count*size
    endm
    else
$comm     macro    name,dist,size,count
    comm dist name[size]:BYTE:count
    endm
    endif
    ?debug    V 300h
        ?debug  S "DEMO2.cpp"
    ?debug    C E9207CC3180A6A6F686E73322E637070
DEMO2_TEXT    segment word public 'CODE'
DEMO2_TEXT    ends
DGROUP    group    _DATA,_BSS
        assume  cs:DEMO2_TEXT,ds:DGROUP
_DATA     segment word public 'DATA'
d@   label    byte
d@w  label    word
_DATA     ends
_BSS segment word public 'BSS'
b@   label    byte
b@w  label    word
_BSS ends
DEMO2_TEXT    segment word public 'CODE'
;
; int X::f(int n)
;
        assume  cs:DEMO2_TEXT
@X@2f$qi  proc far
    inc   bp                ; Usual DLL prolog isn't needed
    push  bp
    mov   bp,sp
    push  di
    mov   di,word ptr [bp+6]
;
; {
```

```
;       if (n==0)
;
    or   di,di
    jne  short @1@86
;
;             return 1;
;
    mov  ax,1
    jmp  short @1@114
@1@86:
;
;
;       return(f(n-1)*n);
;
    push si              ; Pushed because of multiple inheritance thunks
    mov  ax,di
    dec  ax
    push ax
    les  bx,dword ptr [si]   ; However, DS:SI is NOT reloaded
                             ; for the call
    call dword ptr es:[bx]
    pop  cx
    pop  si
    imul di
@1@114:
;
; }
;
    pop  di
    pop  bp
    dec  bp
    ret
@X@2f$qi   endp
;
; int X::main(void)
;
        assume  cs:DEMO2_TEXT
@X@2main$qv     proc far
    inc  bp
    push bp
    mov  bp,sp
    sub  sp,4
;
; {
;       X *a;
;
;       return a->f(16);
;
    push ds              ; Worse case:  preserve DS:SI
    push si
    push 16
    lds  si,dword ptr [bp-4] ; New "this"
    les  bx,dword ptr [si]   ; virtual call
    call dword ptr es:[bx]
    pop  cx
    pop  si
    pop  ds
;
; }
;
    leave
    dec  bp
    ret
@X@2main$qv     endp
    ?debug      C E9
    ?debug      C FA00000000
DEMO2_TEXT      ends
```

```
_DATA       segment word public 'DATA'
s@    label       byte
_DATA       ends
DEMO2_TEXT       segment word public 'CODE'
DEMO2_TEXT       ends
    public      @X@2main$qv
    public      @X@2f$qi
_s@   equ   s@
      end
*********************************************************************
MSC/C++ 7.0 version
*********************************************************************
; Line 9
; n = 000a
?f@X@@VECHH@Z:
    mov   ax,ds    ; DLL prolog
    xchg  ax,ax
    inc   bp
    push  bp
    mov   bp,sp
    push  ds
    mov   ds,ax
    sub   sp,OFFSET L00346
    push  si
    push  di
; Line 10
    cmp   WORD PTR 10[bp],OFFSET 0
    jne   L00341
; Line 11
    mov   ax,OFFSET 1
    jmp   L00340
; Line 13
L00341:
; Line 14
    mov   ax,WORD PTR 10[bp]
    add   ax,OFFSET -1
    push  ax
    les   bx,WORD PTR 6[bp]    ; Load "this" each function call!
    push  es
    push  bx
    les   bx,WORD PTR es:[bx]
    call  DWORD PTR es:[bx]
    imul  WORD PTR 10[bp]
    jmp   L00340
; Line 14
L00340:
    pop   di
    pop   si
    lea   sp,WORD PTR -2[bp]
    pop   ds
    pop   bp
    dec   bp
    ret   OFFSET 6
; Line 0
; Line 17
main:                ; in BC++ -po this would be omitted
    mov   ax,ds      ; since don't need DGROUP
    xchg  ax,ax
    inc   bp
    push  bp
    mov   bp,sp
    push  ds
    mov   ds,ax
    sub   sp,OFFSET L00347
    push  si
    push  di
; a = fff8
```

```
; Line 18
; Line 20
; Line 21
     mov   ax,OFFSET 16
     push  ax
     les   bx,WORD PTR -8[bp]
     push  es                      ; Have to push ES:BX
     push  bx
     les   bx,WORD PTR es:[bx]
     call  DWORD PTR es:[bx]
     jmp   L00344
; Line 21
L00344:
     pop   di
     pop   si
     lea   sp,WORD PTR -2[bp]
     pop   ds
     pop   bp
     dec   bp
     ret   OFFSET 4
; Line 0
```

What is claimed is:

1. In a system for generating code executable by a computer from object-oriented source listings, said source listings including definitions of classes of objects having data members and functions operative on said data members, the computer including a memory stack for creating automatic variables, a method for passing classes of objects by value to a function, the method comprising:

(a) identifying by the system a class argument being passed by value as a parameter to a particular function, said class argument comprising an object to be instantiated from a particular class;

(b) creating a surrogate variable for the class argument by allocating space on the memory stack for storing said value; and (c) determining an address of said surrogate variable on the memory stack when code referencing said class argument is generated.

2. The method of claim 1, wherein step (b) includes the substep:

adjusting a pointer to said memory stack by an amount required for storing the value of the class argument, whereupon space is allocated on the memory stack for storing said value.

3. The method of claim 1, wherein step (b) includes the substep:

marking said surrogate variable with a unique identifier for distinguishing it from non-surrogate automatic variables.

4. The method of claim 1, wherein said memory stack includes at least one frame pointer for accessing arguments and automatic variables within a stack frame, and wherein said address includes an offset from said at least one frame pointer for accessing said value at a memory location within said stack frame.

5. In a system for generating machine code executable by a computer, the computer including an Intel 80×86-compatible processor and a memory including a stack segment, said computer for executing program code comprising data and functions operative on said data, a method for passing classes of objects by value to a function, the method comprising:

(a) identifying by the system a class argument which is being passed by value to a function;

(b) creating a surrogate variable for the class argument by allocating space on the stack segment for storing said value; and (c) determining an address of said surrogate variable on the stack segment when code referencing said class argument is generated.

6. The method of claim 5, wherein step (b) includes adjusting a stack pointer (SP) register of said processor, whereby additional space is allocated on the stack segment.

7. The method of claim 5, wherein step (c) includes storing in a base pointer (BP) register of said processor a frame pointer for accessing arguments and automatic variables within a stack frame, wherein said address is referenced as an offset from said frame pointer.

8. A system for developing compiled computer code, the system comprising:

a computer having a processor and a memory, said memory including a stack segment for storing function arguments and local data;

a compiler for generating computer code from source listings, said source listings including definitions of classes of objects having data members and methods operative on said data members;

means, operably coupled to said compiler, for identifying by the system a class argument being passed to a function, said class argument being passed by value to the function;

means, operably coupled to said compiler, for storing said value by allocating space on the stack segment; and means, operably coupled to said compiler, for determining an address of said value on the stack segment when code referencing said class argument is generated.

9. The system of claim 8, wherein said processor includes a register for storing a frame pointer for accessing function arguments and local data stored in the stack segment, and wherein said address is formed by adding an offset to the frame pointer.

10. In a computer system for executing computer programs compiled from object-oriented source listings, the computer including a memory having a plurality of data and code segments and including a processor with a plurality of segment registers for addressing said plurality of data and code segments, a method for accessing objects created from classes of objects, the method comprising:

(a) defining a class of objects, said class including data members and methods operative on said data members;

(b) creating at least one object from said defined class by storing said data members of the class in a data segment of the memory, whereupon a selected one of said segment registers is loaded with an address of said data segment; and (c) accessing said at least one object with said loaded data segment address.

11. The method of claim 10, wherein step (c) includes the substeps:

loading an offset address in another register of the processor; and accessing selected ones of said data members and methods with an address including said loaded data segment address and said loaded offset address.

12. The method of claim 11, wherein said processor assumes said data members are stored in a default data segment, whereby access to the data members only requires an offset address.

13. The method of claim 11, wherein said processor is an Intel 80×86-compatible microprocessor with a DS register for accessing the data segment and an SI register for accessing an offset within a selected segment of memory, and wherein a pointer for accessing said at least one object is constructed from a DS:SI register pair.

* * * * *